United States Patent
Hager et al.

(10) Patent No.: US 7,610,588 B1
(45) Date of Patent: Oct. 27, 2009

(54) DISTRIBUTED APPLICATION MANAGEMENT SOFTWARE

(75) Inventors: Geoffrey Hager, New York, NY (US); Robert Chang, Plainsboro, NJ (US); Robert Tjia, Forest Hills, NY (US)

(73) Assignee: Global 360, Inc., Dallas, TX (US)

(*) Notice: Subject to any disclaimer, the term of this patent is extended or adjusted under 35 U.S.C. 154(b) by 569 days.

(21) Appl. No.: 09/697,958

(22) Filed: Oct. 27, 2000

(51) Int. Cl.
G06F 9/44 (2006.01)
G06F 15/16 (2006.01)

(52) U.S. Cl. .......... 719/317; 709/202
(58) Field of Classification Search ........ 709/202, 709/223–226, 203; 719/310, 311, 316, 317, 719/320, 330; 715/234, 239
See application file for complete search history.

(56) References Cited

U.S. PATENT DOCUMENTS

| | | | |
|---|---|---|---|
| 5,452,433 A * | 9/1995 | Nihart et al. ........ 709/223 |
| 5,655,081 A * | 8/1997 | Bonnell et al. ........ 709/202 |
| 5,881,230 A | 3/1999 | Christensen |
| 5,884,196 A * | 3/1999 | Lekven et al. ........ 455/574 |
| 5,898,835 A | 4/1999 | Truong |
| 5,923,756 A | 7/1999 | Shambroom |
| 5,958,010 A * | 9/1999 | Agarwal et al. ........ 709/224 |
| 5,983,233 A | 11/1999 | Potonniee |
| 5,987,135 A * | 11/1999 | Johnson et al. ........ 709/224 |
| 6,012,098 A | 1/2000 | Bayeh et al. |
| 6,029,246 A * | 2/2000 | Bahr ............... 726/4 |
| 6,049,819 A * | 4/2000 | Buckle et al. ........ 709/202 |
| 6,067,414 A | 5/2000 | Wang et al. |
| 6,085,220 A | 7/2000 | Courts et al. |
| 6,105,043 A | 8/2000 | Francisco et al. |
| 6,122,664 A * | 9/2000 | Boukobza et al. ........ 709/224 |
| 6,219,708 B1 | 4/2001 | Martenson et al. |
| 6,256,635 B1 | 7/2001 | Arrouye et al. |
| 6,289,378 B1 | 9/2001 | Meyer et al. |
| 6,289,382 B1 * | 9/2001 | Bowman-Amuah ...... 709/226 |
| 6,301,266 B1 * | 10/2001 | Peterson et al. ........ 370/465 |
| 6,314,451 B1 * | 11/2001 | Landsman et al. ........ 709/203 |
| 6,317,761 B1 * | 11/2001 | Landsman et al. ........ 715/513 |
| 6,321,261 B1 * | 11/2001 | Glass ............... 709/223 |
| 6,332,163 B1 * | 12/2001 | Bowman-Amuah ...... 709/231 |

(Continued)

FOREIGN PATENT DOCUMENTS

EP 0 909 058 A2 9/1998

(Continued)

OTHER PUBLICATIONS

F. Rabii, et al, "The Process Management Architecture of OSF/1 AD Version 2", OSF Research Institute, Sep. 1993. pp. 17.*

(Continued)

*Primary Examiner*—Van H Nguyen
(74) *Attorney, Agent, or Firm*—Hamilton, Brook, Smith & Reynolds, P.C.

(57) ABSTRACT

A system and method is provided for remote administration and management of a computer network, by installation of distributed software agents in remote network components, such as software agents implemented using encapsulated reusable interfaces such as COM or CORBA interfaces. Remote network management is effected by communication with the distributed agents using a structured language-independent parsable text document, such as a markup language; e.g. XML.

5 Claims, 4 Drawing Sheets

U.S. PATENT DOCUMENTS

| | | | |
|---|---|---|---|
| 6,356,931 B2 * | 3/2002 | Ismael et al. | 709/202 |
| 6,466,971 B1 * | 10/2002 | Humpleman et al. | 709/220 |
| 6,516,338 B1 * | 2/2003 | Landsman et al. | 709/203 |
| 6,529,784 B1 * | 3/2003 | Cantos et al. | 700/79 |
| 6,539,416 B1 * | 3/2003 | Takewaki et al. | 709/202 |
| 6,539,422 B1 * | 3/2003 | Hunt et al. | 709/217 |
| 6,546,387 B1 * | 4/2003 | Triggs | 707/5 |
| 6,571,285 B1 * | 5/2003 | Groath et al. | 709/223 |
| 6,574,655 B1 * | 6/2003 | Libert et al. | 709/200 |
| 6,671,724 B1 * | 12/2003 | Pandya et al. | 709/226 |
| 6,675,212 B1 * | 1/2004 | Greenwood | 709/224 |
| 6,834,389 B1 * | 12/2004 | Glass | 719/317 |
| 6,970,924 B1 * | 11/2005 | Chu et al. | 709/224 |
| 2002/0032768 A1 | 3/2002 | Voskuil | |

FOREIGN PATENT DOCUMENTS

| | | |
|---|---|---|
| EP | 0 909 058 A3 | 9/1998 |
| WO | WO 99/57649 A2 | 11/1999 |
| WO | WO 99/57649 A3 | 11/1999 |

OTHER PUBLICATIONS

M. Jones, "Interposition Agents: Transparently Interposing User Code at the System Interface", ACM, 1993, pp. 80-93.*

H. Guo, et al, "Research on Integrated Model Based on XML, CORBA and Agents", IEEE, Jul. 2001, pp. 344-348.*

Computer Dictionary, 3rd ed. Microsoft Press, 1997, pp. 39-40.*

"XML: Overview," http://www.oasis-open.org/cover/xml.html, Jan. 6, 1999, 2 pp.

H. Maruyama, et al., "XML and Java—Developing Web Applications," Chapters 6 and 7, (ISBN 0-201-48543-5), Addison Wesley Longman, Inc. 1999, pp. 185-280.

Lavallee, B., et al., "Improving Power supply Reliability at a Reduced Cost Using Test Automation and Data Management," *Telecommunications Energy Conference, 1995. Intelec 1995., 17th International The Hague*, Netherlands Oct. 29, 1995-Nov. 1, 1995, *IEEE Proceedings* (Oct. 29, 1995) pp. 132-136.

Supplementary European Search Report from PCT/US2001/46139, mailed from the European Patent Office on May 11, 2009.

* cited by examiner

DISTRIBUTED APPLICATION MANAGEMENT SOFTWARE

FIELD OF THE INVENTION

Computer Program Listing Appendix

This application includes computer program listing appendices on compact disc. A duplicate compact disc has also been provided. Each compact disc contains files of the computer program listings as follows:

| File Name | Date of Creation | Size (Bytes) |
|---|---|---|
| COMPUTER PROGRAM LISTING APPENDIX A.PDF | 07/23/2004 | 23,000 |
| COMPUTER PROGRAM LISTING APPENDIX B.PDF | 07/23/2004 | 28,000 |
| COMPUTER PROGRAM LISTING APPENDIX C.PDF | 07/23/2004 | 69,000 |
| COMPUTER PROGRAM LISTING APPENDIX D.PDF | 07/23/2004 | 62,000 |
| COMPUTER PROGRAM LISTING APPENDIX E.PDF | 07/23/2004 | 412,000 |
| COMPUTER PROGRAM LISTING APPENDIX F.PDF | 07/23/2004 | 1,025,000 |
| COMPUTER PROGRAM LISTING APPENDIX G.PDF | 07/23/2004 | 161,000 |

The computer program listings contained in the above files are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention generally relates to a software system and method for remote administration and management of distributed computer applications that run on a computer network.

BACKGROUND OF THE INVENTION

It is now generally recognized in the computer software industry that multi-tier distributed server architectures confer a variety of benefits, including increased capacity, throughput, fault tolerance, scalability, and reliability. However, due to their decentralized nature, such architectures pose particular difficulties in the area of application management and administration.

One of the chief difficulties involved with such systems is their cost of ownership. When deployed in production settings, software systems based on distributed server architectures typically incur a high cost of ownership, including costs incurred from the need to employ and train a large number of administrative and maintenance personnel as well as costs incurred from the difficulty of isolating and fixing problems. Cost of ownership is further multiplied in the case of software systems that are distributed across multiple geographic locations.

This high cost of ownership constrains the market for commercial software products based on distributed server architectures. Minimizing the cost of ownership significantly expands the potential market for these software products and allows more organizations to take advantage of the benefits conferred by such products.

A special type of software program is a background process that may be started automatically by an operating system at startup. For example, background processes that run on certain Microsoft operating systems such as Windows NT and Windows 2000 are termed "services." Generally, services are a background process which is loaded by part of the operating system kernel, typically at startup or bootup, prior to any user log-ins. Services differ from other software programs in that they can be configured to start automatically when the operating system starts, thus simplifying administration. In addition; they generally do not require a logged-on user in order to run and they run in their own security context. Services typically are accessed by an operating system directly, and thus have no local user interface, although they can usually be launched manually by a user through a service control utility, e.g., a "control panel" or the like. Other operating systems, such as UNIX, have similar background processes, typically termed daemons, although for purposes of the present invention these background processes may be referred to as generally as services.

A software system based on distributed services, i.e., services existing on various remote computers, can take advantage of the characteristics of services to reduce the cost of ownership. However, because services have no local user interface; such a software system typically requires a remote administrative user interface to manage the distributed services. It would be desirable to enable the administration of such a software system either from a single computer at a central location or from multiple computers at different locations, depending on the deployment scenario and the requirements of the customer.

Existing network management standards, such as the SNMP and CMIP standards, have focused on management of the underlying network and associated devices rather than management of heterogeneous networked software applications. SNMP, for example, supports getting and setting properties on user-definable managed objects but offers no direct support for parameterized method execution. Other management standards, such as WBEM, can accommodate services as managed objects, but the relevant provided interfaces are limited to the least common subset of service properties and methods and are not easily extensible to accommodate rich service-specific property sets.

While certain existing network management approaches can theoretically support rich service-specific property sets through the definition of custom classes or interfaces, such approaches generally suffer from one or more of the following limitations: There is typically no easy-to-use programming interface to support rapid application development the design and implementation of custom classes and interfaces is prohibitively difficult and labor-intensive, property sets are at best expressible simply as collections of name/value pairs and therefore cannot easily express rich structure, property sets are generally limited in size, custom classes and interfaces are generally not resilient to change in the underlying service property sets no mechanism is provided to control bandwidth by allowing a client administrative program to specify a subset of properties to retrieve, and/or no security mechanism is provided.

In some networked applications of the prior art, e.g. a front-end database management application, an application may communicate directly with managed network services. However, there are problems with such a design. For example, this design prohibits any viewing and setting of configuration information unless the managed services are active. This reliance on services being active is unacceptable, because typically services are heavyweight processes that often taken a long time to initialize and consume many system resources. In a distributed application it is not uncommon for the services on a particular remote machine to be inactive, which in such a design would prohibit the application of consistent configuration changes across similar services on several machines.

Generally, service properties and statistics are hierarchical and nontabular in structure and generally lack fixed dimensionality. Because the set of properties and statistics desired in network management communications, regarding both background process status and network performance parameters, are likely to change frequently in the future, preferably the design of a network management tool must be flexible and extensible. In addition, various data types pertinent to network administration and performance analysis must be supported, including strings, Boolean or dummy variables, date/time, and integrals. Incurring a network round trip for each read or write of an individual property or statistic is undesirable, because this may cause networked application administration to impose a significant load on the network. Similarly, it is desirable to be able to apply changes to service properties in bulk or batched fashion. Finally, it would be desirable that collections of properties and statistics should be accessible and navigable using a standardized or open technique rather than a proprietary one if possible.

It would be desirable to provide a software tool for management of distributed services on a network, providing for ease of administration for distributed computer applications that run on computer network systems with reduced cost of ownership, that does not suffer from the above limitations. In particular, in managing distributed services on a computer network, rather than being limited to getting and setting one property or statistic at a time, preferably a software tool would act in a fashion to batch certain functions in order to conserve bandwidth when possible. Preferably, this software tool will combine relative ease of client programming with extensibility, while minimizing network overhead and traffic.

It is at least theoretically possible to provide distributed computer applications administration tools utilizing COM interface properties, tabular reports, standard COM collection objects such as SAFEARRAYs, or custom marshalling. However, these potential methods violate the desired administration properties detailed above.

An Extensible Markup Language (XML, for eXtensible Markup Language) has been developed as a restricted form of the more cumbersome SGML (Standard Generalized Markup Language). Generally, XML describes a class of data objects, XML documents, which may be parsed by XML processors in remote locations in order that the remote application may access the structure and content of the XML document in a form meaningful to the application. The XML processor, following the XML rules about what information from the XML document it must provide to the application, sends relevant data and instructions to the remote application. In contrast to HTML, a different SGML derivative, XML provides a facility for developers to provide their own XML markup and tag types which may be useful in providing information to a remote application. This application, via a XML processor, may receive instructions or data contained in an XML document, and may return data or instructions in a similar way. While XML documents will naturally be larger than application-specific or native binary files sent directly between applications, they are language independent, and as text files, are easier to maintain and debug than corresponding binary "bitstream" transmissions.

SUMMARY OF THE INVENTION

An object of the present invention is to provide an extensible framework for the remote management of software systems, particularly distributed services. In one embodiment of the present invention, management and administrative functionality is provided that includes a facility for remotely ascertaining and modifying the status of the distributed services comprising the managed software system, remotely ascertaining the relationship among these services, remotely ascertaining and configuring the values of various groups of service properties that may either be shared among multiple services or specific to individual services, remotely obtaining various service statistics that may either be shared among multiple services or specific to individual services, and remotely obtaining version information. This version information and other distributed network information may pertain either to specific embodiments of the present invention and to individual managed services. The present invention may be used in various networked enterprise applications, such as data processing or work routing applications.

In a preferred embodiment of a software component framework according to the subject invention, a distributed agent framework is implemented that may be updated in accordance with modifications and enhancements of the services that make up the managed application overseeing the distributed agents. In addition, it is preferable to provide an environment or framework in which client management applications may be composed which reflect the full capacity and structure of the various properties and statistics associated with the diverse managed services. In a further preferred embodiment, this software component framework for updating and managing remote network services is implemented via XML or another SGML derivative.

Furthermore, in a preferred embodiment of the subject invention, bulk transfer of properties and statistics may be effected, in order to 'batch' network management tasks, and thus conserve bandwidth and reduce overhead. It will also be preferred in implementing the subject invention that, in order to further conserve network bandwidth by eliminating unnecessary data communications, a client application may specify a subset of properties or statistics to retrieve on a given call.

In addition, a preferred embodiment of the invention will provide automated or otherwise facilitated client programming which avoids the need for bit stream parsing or proprietary encoding at the client level. For example, this automation may be implemented using COM automation. COM (Component Object Model) components are reusable and generalized modules of code which define an language-independent interface for certain software functions. General information about the implementation of COM objects may be obtained from the Microsoft Corporation of Redmond, Wash. Other reusable software interfaces which provide encapsulation, particularly object-oriented interfaces, may also be utilized in order to provide client-level interfaces with the network management software according to the present invention. In a preferred embodiment of the invention, these reusable software interfaces will be language independent. For example, interfaces provided under the CORBA (Common Object Request Broker Architecture) are believed to provide suitable interface components for the present invention. For example, suitable interfaces may be implemented in, and used by, Java, Visual Basic, C++, for example, or may be found in Enterprise Java Beans libraries or COM libraries.

In order to achieve the objectives of a preferred embodiment as detailed above, a SGML-derivative may be utilized to implement the subject invention. SGML will generally prove unsatisfactory for implementing the present invention, due to its relatively slow and unwieldy structure, and poor transmission characteristics. A derivative of SGML which will provide a more lightweight markup language suitable for network transmission is preferable to SGML. For example, XML may be utilized. Instructions and data may be embedded into XML documents and transmitted to remote servers or other network components for parsing and sending to server-side and other applications remote from the user or network administrator. For example, the XML document may contain embedded instructions to a NT service. In a preferred embodiment, these instructions will be polymorphic, i.e., they may consist of managed sets of network properties and statistics which may vary according to context, but will not be rejected by the target remote application as erroneous.

In a further preferred embodiment of the subject invention, distributed agents may be utilized in order to accommodate diverse polymorphic managed services. These agents, actually software routines, may be dispatched to dynamically discover, for example, changes to network topology or changes to the topology of the distributed application. Because these agents may discover such configuration properties "on the fly," the network need not be taken down for analysis, and network performance is not impacted in the course of measuring the performance. In addition, the distributed agents enable remote viewing of configuration properties associated with diverse polymorphic background processes, services, or applications, even if those processes are inactive. The agent entities pass the acquired statistics and properties via XML documents to the client Management Component application, as detailed elsewhere in this Specification.

These agents are capable of managing polymorphic services, i.e., services which are derived from or instantiated from a common base or generic type. These services which are instantiated from a generic type will share common functions or methods with the base services, and may accept arguments of a similar data type, or may accept alternative data type arguments. Polymorphism is a software property which is important in providing for reusable code. In other words, polymorphism allows operations to be applied over various data types.

It will also be preferred that such agents will be extensible to support new or modified services, and will be able to support many different distributed application and network topologies. In this regard, these distributed agents will preferably be able to dynamically discover changes to the topology of a distributed application being considered or monitored. It will also be preferred to enable remote viewing and modification by a human network administrator, or to allow modification of configuration properties associated with diverse polymorphic services by automated network management software. This preferred embodiment enables the remote viewing and/or modification of configuration properties associated with these diverse polymorphic services even when those services are inactive. In this embodiment, the problems, a central point of failure, and processing bottlenecks are both avoided. Both of these problems are major sources of network performance deficiencies. A further advantage of the present invention is that a high degree of scalability may be achieved.

In a preferred embodiment, the present invention provides further increases in the efficiency of network administration and performance criteria by the application of automated component interfaces, such as COM components, which preferably act as a type of remote agent, distributed among and resident on remote server and network resources, with access to statistical and state information regarding those resources.

Without providing for a distributed agent layer, front-end management applications would be required to communicate directly with the managed services. In addition to being substantially more brittle and less extensible than the present invention, this design would prohibit any viewing and setting of configuration information unless the managed services are active. This reliance on active services is highly unattractive, because services are heavyweight processes that often taken a long time to initialize and consume many system resources. In a distributed application it is not uncommon for the services on a particular machine to be inactive, which would prohibit the application of consistent configuration changes across similar services on several machines. Lightweight distributed agents facilitate such scenarios because they are quick and inexpensive, in terms of computing overhead, to activate for such purposes.

Management components according to an embodiment of the present invention operate as a type of software agent that undertake several distributed management and monitoring tasks. While the management components of the present invention will typically be neither autonomous nor asynchronous, the management components of the present invention may be regarded as "agents" in that they are independent distributed software objects that mediate the interaction between a remote user and the services or other remote processes being managed. The management components also communicate with each other to accomplish the management task. In one embodiment of the present invention the management components are designed, as a security precaution, so as to be incapable of autonomously migrating across networked hosts. In other words, the management components may be implemented so as to lack "mobility."

Unlike distributed systems that do not use independent software objects to mediate the interaction between the user and the managed services, the management components of an embodiment of the present invention mediate the interaction between user and service, and also communications with other management components.

In a preferred embodiment of the present invention, the network management system is developed using encapsulated interface objects, such as COM components, or certain Enterprise Java Beans classes. These interface objects or classes may be defined by standards such as CORBA, or they may be defined under proprietary systems. Certain of these object components may be found in pre-existing component or object libraries which are widely available from a variety of vendors, including Microsoft Corporation, of Redmond, Wash., or Sun Microsystems, Inc., of Palo Alto, Calif.

In a preferred embodiment of the subject invention, automation interfaces, such as COM automation interfaces, are implemented as server-side components. In this way, the present invention may support the easy and rapid development of front-end management applications using a wide variety of programming languages and techniques, including scripting languages such as VBScript and JavaScript in addition to languages such as Visual Basic, Java, and C++, or any language which may access the encapsulated automation interface to be used. For example, in an embodiment of the subject invention in which COM components are used, even an Excel brand spreadsheet could be used to script a front-end management application for the remote management component.

In an embodiment of the present application in which the COM automation interfaces are used, a wide range of possible client applications may be supported. These include, but are not limited to, web browser-based management interfaces to standalone 'thick' Windows programs to Microsoft Management Console 'snap-ins'. In this embodiment of the present invention, new client applications may be developed without having to specifically modify the services comprising the managed application to support any particular type of management client program. Encapsulated reusable interfaced code, such as the COM automation interfaces, may be expected to support easy integration of the management components of the present invention. Such encapsulated code serves particularly to provide managed application of external systems, particularly external systems management infrastructures.

In a preferred embodiment of the present invention, a SGML-derived markup language is used to provide remote retrieval and configuration of property sets in a bulk or batch fashion, thus minimizing network round trips and in turn conserving network bandwidth. It has been found that XML provides a suitable format to represent service properties and statistics.

The present invention also allows remote administrative client programs to specify one or more particular subsets of available properties or statistics to retrieve for or form a managed service, thereby further conserving network bandwidth. Rather than imposing a single limiting structure for properties and statistics, the present invention can accommodate service-specific sets of properties or statistics having any organizational structure, including complex hierarchical structures, while still maintaining ease of programming for remote administrative client programs. Another advantage of the present invention is that it imposes no size limit on sets of properties or statistics.

An advantage of the preferred embodiment of the present invention is that properties of the services comprising the managed software system can be ascertained and configured regardless of whether these services are currently running.

Another advantage of the present invention is that it is easily extensible to support an unlimited variety of services, each of which may expose or obtain a unique set of properties and statistics. It also adapts easily to modifications of the managed services, including modifications to the set of properties and statistics exposed by a managed service.

Furthermore, a typical embodiment of the present invention scales extremely well to accommodate managed systems of unlimited size and scope without imposing any processing bottleneck proportional to the size or scope of the managed system. Another advantage is that it imposes no single points of failure upon the managed system.

Another advantage of the present invention is that it provides an easy-to-use programming interface to facilitate rapid development of remote administrative client programs. It also facilitates integration with external systems other than the managed system.

Another advantage of the present invention is that it supports a variety of remote administrative client programs, including both traditional 'thick' client programs as well as 'thin' web browser-based client programs. Furthermore, the invention supports various types of remote administrative client programs running concurrently against the same managed system.

In a representative implementation of the present invention, remote administrative client programs may easily and dynamically discover the set of services comprising the managed distributed software application and the precise distribution of these services across computers in the application domain, even in the event that one or more of these computers is inactive. Because the present invention provides a mechanism to determine this information dynamically, remote administrative client programs do not have to contain sophisticated programming logic to determine this information themselves or to persist this information across sessions, and remote administrative client programs can dynamically discover changes to the topology of the distributed application without employing any special programming logic for this purpose.

In a preferred embodiment of the present invention, a high level of security is provided by the use of role-based method-level access control.

While, in a preferred embodiment of the subject invention, the invention is implemented as part of a network operating system, for example, or enterprise application such as a workflow management application, the network management tools of the present invention may also be implemented as a standalone implementation.

DETAILED DESCRIPTION OF THE INVENTION

The following terms are used in this description of a preferred embodiment of the invention, generally, and with regard to an embodiment of the subject invention adapted to remotely administer a network running on a Microsoft operating system, such as Windows NT:

| | |
|---|---|
| COM | Microsoft Component Object Model |
| DCOM | Microsoft Distributed Component Object Model |
| IDL | Interface Definition Language |
| MC | Software Management Components according to the present invention |
| MMC | Microsoft Management Console |
| MTS | Microsoft Transaction Server; also termed COM+ in regards to the Windows 2000 operating system |
| MTS Explorer | Microsoft Transaction Server Explorer; Component Services Applet on Windows 2000 |
| SCM | Service Control Manager |

Figure 1:
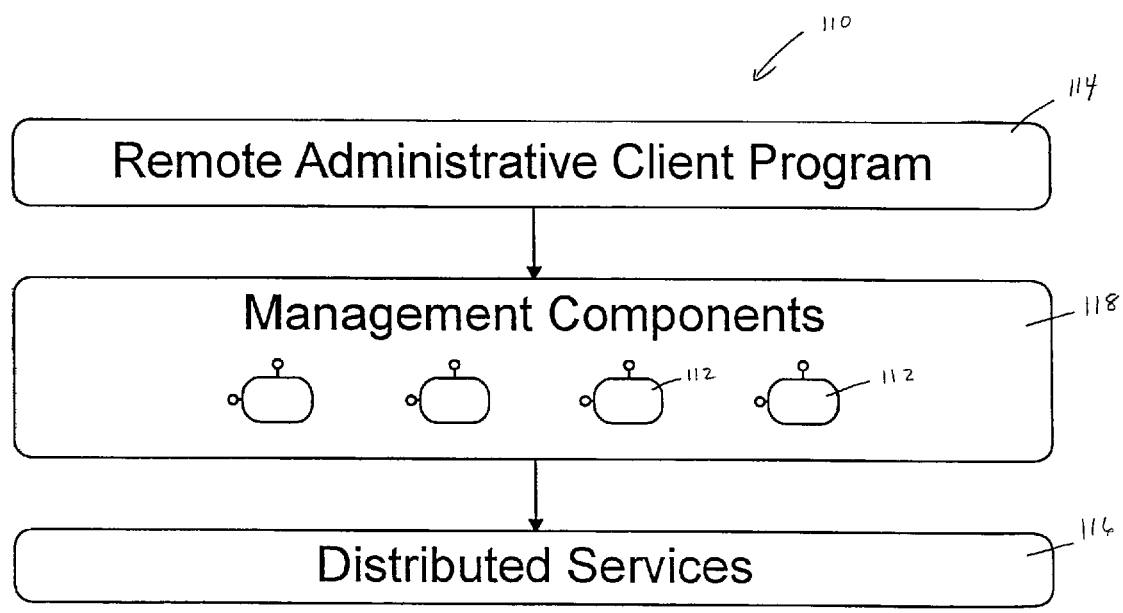
FIG. 1 is a schematic diagram of the architectural environment of an embodiment of the invention.

FIG. 1 depicts a simplified view of the architectural context 110 of a preferred embodiment of the invention (the Software Management Components) in relation to a managed software system made up of distributed services and a remote administrative client program. This implementation of the present invention is adapted for a Windows operating system, or other operating system utilizing COM encapsulated interface components although other encapsulated interface objects may also be used. In this implementation, COM components 112, or alternative encapsulated interfaces which are language-independent, serve as interface modules between the administrative client program 114, and various distributed background processes 116 running on remote network resources, e.g., servers. The various COM components of the Management Component level 118 are shown as standard COM notation components 112 within the Management Component level of the architecture 110.

Figure 2:
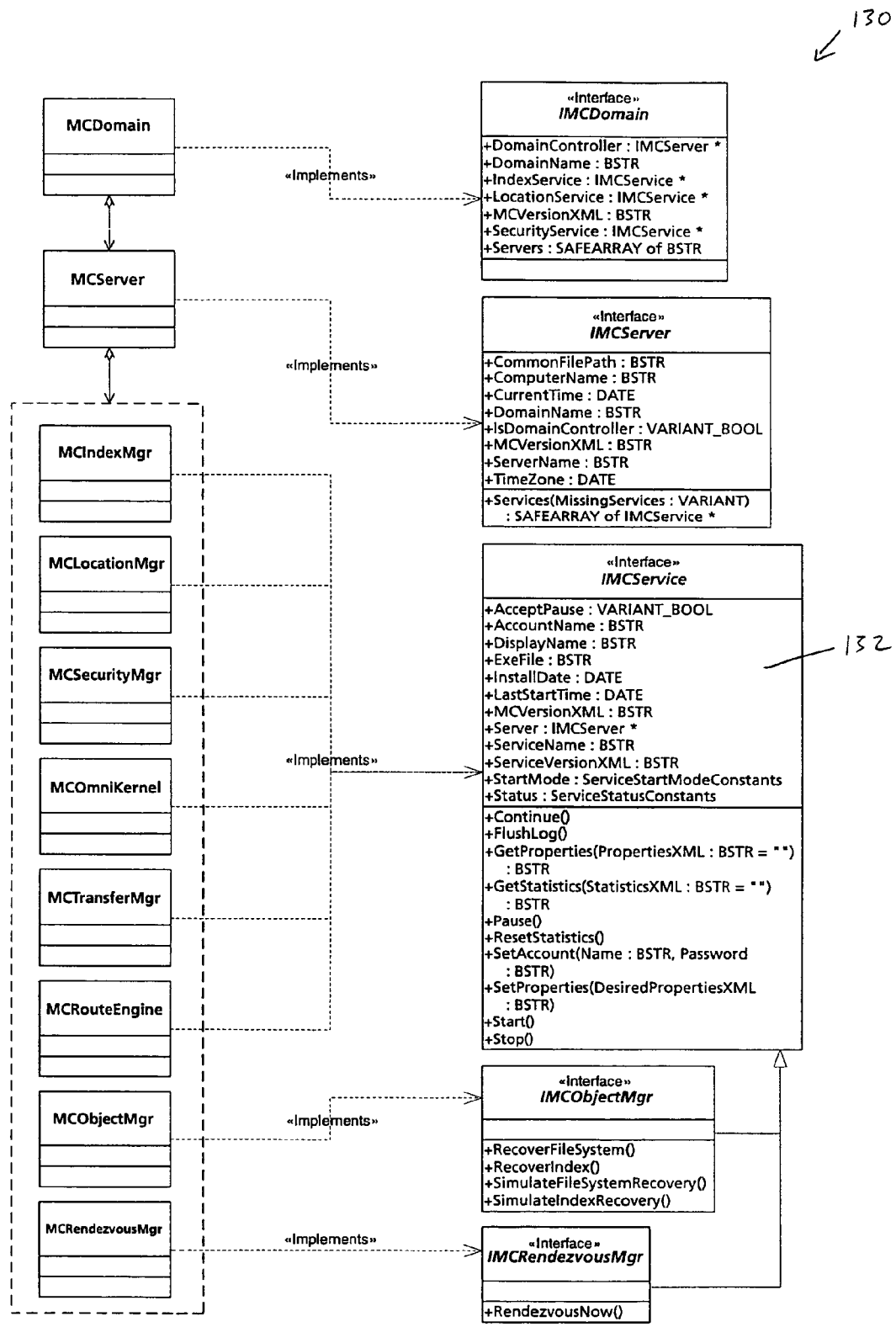
FIG. 2 is a class diagram of an embodiment of the present invention.

FIG. 2 depicts a class diagram 130 showing interface methods, interface properties, classes, associations, and inheritance relationships of an embodiment of the present invention, which may be implemented, for example, as COM interfaces 112 of FIG. 1. FIG. 2 identifies the software components comprising a preferred embodiment of the invention along with the interfaces 132 implemented by said components. The diagram uses conventions adapted from the Unified Modeling Language (UML) to depict interface methods, interface properties, classes, associations, and inheritance relationships. These components, as implemented in Visual Basics as an example, are provided in Source Code Appendix A.

Figure 3:
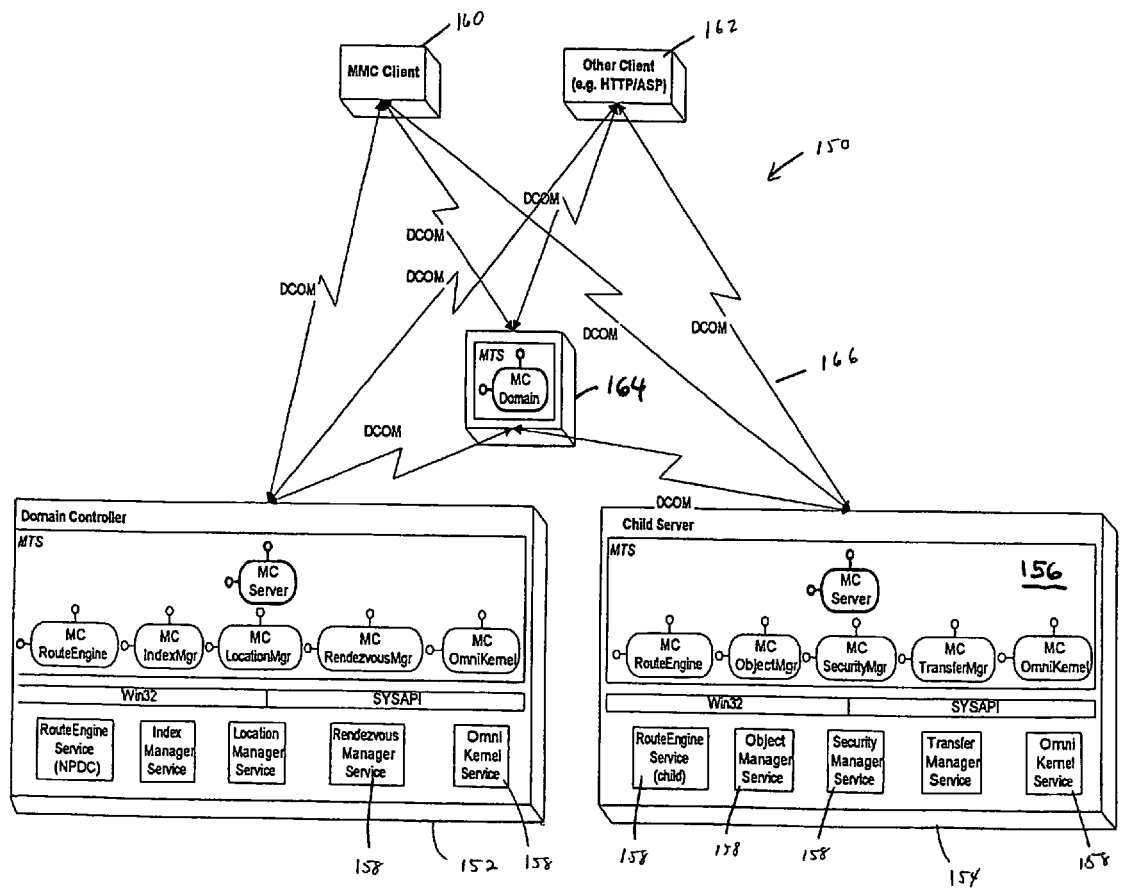
FIG. 3 is a schematic diagram of an embodiment of the present invention installed at a single location.

FIG. 3 depicts a schematic diagram 150 of a deployment of a preferred embodiment of the invention across several computers at a single location, showing specific COM interfaces which may be implemented in both a domain controller 152 and in a child server 154. This diagram implements the component interfaces depicted in class diagram 130 of FIG. 2, specifically as COM interfaces 156. These COM interfaces 156 may monitor and in most cases control corresponding service elements 158 of a specific managed system. These interfaces 156 operate as "agents" on the remote network resources, within the definition of "agent" discussed previously. Also depicted are two specific remote administrative client programs MMC client 160 and a typical HTTP client 162. The MMC (Microsoft Management Console) client 160 and HTTP client 162 access the domain controller and child server COM interfaces 156 via MTS server 164, according to the DCOM (Distributed Component Object Model) security interface, used to authenticate clients, and also capable of implementing encryption across transmission paths. Alternatively, a security protocol such as Kerberos could be used to protect network communications along pathways 166 and provide authentication. Alternatively, MTS authentication may be implemented for security.

Figure 4:
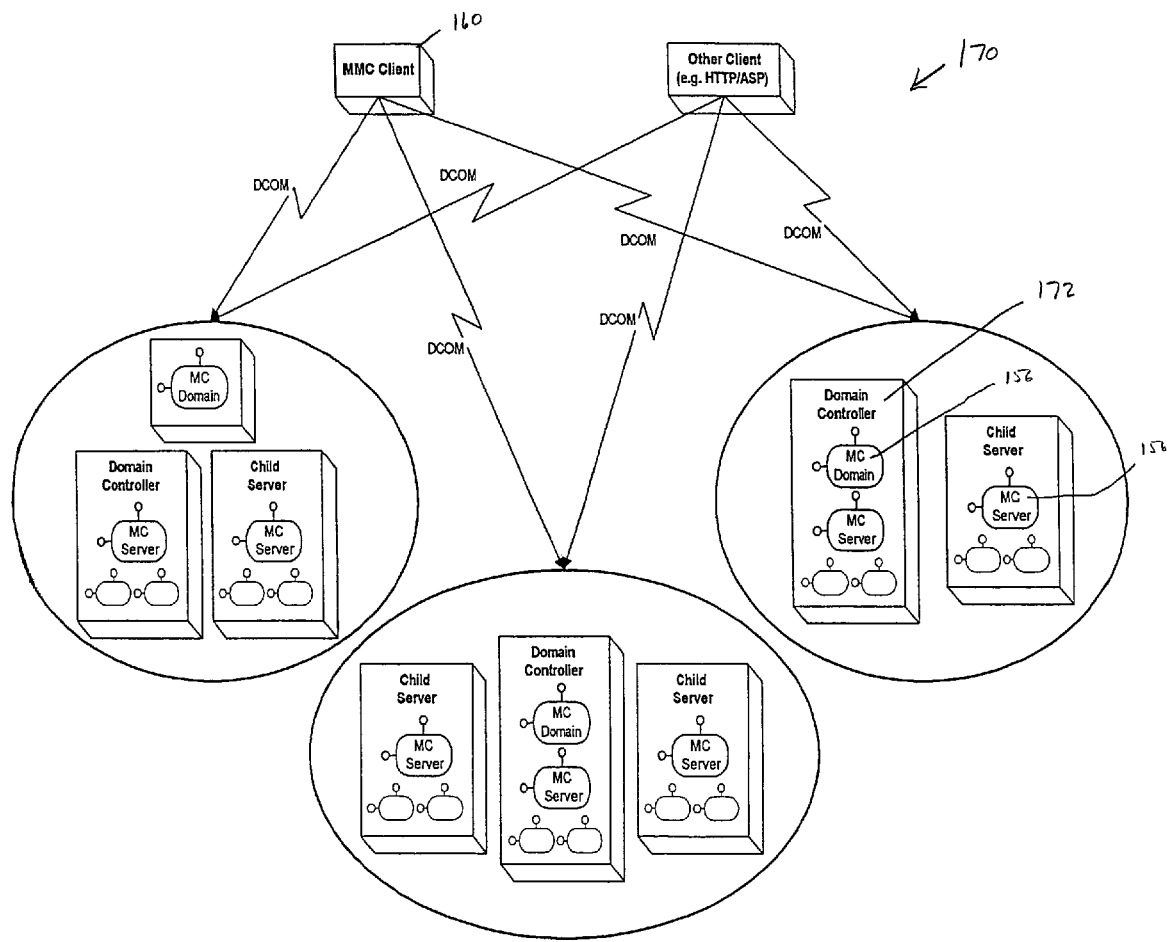
FIG. 4 is a schematic diagram of an embodiment of the present invention across many computers at multiple locations.

FIG. 4 depicts a schematic representation of a typical deployment of a preferred embodiment of the invention across many computers at multiple locations. This diagram depicts a network system 170, consisting of interface modules such as encapsulated reusable COM interface modules 156, the modules corresponding generally to the interface components depicted in the class diagram 130 of FIG. 2, as well as the corresponding service elements of a specific managed system and two specific remote administrative client programs.

The Management Components of the present invention are, by way of example, implemented as shown in FIG. 4 as a single, in-process, interfaced, encapsulated component, e.g., a COM component. In a preferred embodiment, in which the management components are implemented as a COM component, the management component implements classes that are designed to run in Microsoft Transaction Server (MTS). For example, Management Component objects according to a preferred embodiment may reside on ENTERPRISE APPLICATION servers, i.e., servers running an enterprise application on the Windows NT brand platform. Management Component clients 160 typically access Management Component objects 172 remotely via a distributed encapsulated interfaced component or class implemented server, e.g., DCOM or via Microsoft MTS.

When implemented as a COM interface, the Management Components distributed object model preferably specifies several COM interfaces that are implemented by the Management Component COM classes. In order to support a wide variety of clients, the Management Component interfaces are exposed as COM dual interfaces, i.e. both as custom v-table interfaces and through a standard COM IDispatch interface.

Also in a preferred embodiment, and as depicted in the class diagram 130 of FIG. 2 one or more MCDomain or similar instances support each Application Domain, e.g., each ENTERPRISE APPLICATION domain. MCDomain instances may typically reside on the domain controller of the corresponding application domain, although other configurations are also possible, including instantiation of MCDomain objects for an application domain on machines other than the application domain controller; instantiation of MCDomain objects on multiple machines for a single application domain; or instantiation of MCDomain objects on the same machine for multiple application domains.

Preferably the MCServer class or equivalent will be installed on each application server that hosts at least one application service. Each application service installed on an application server additionally will preferably have the corresponding Management Components service class to be installed on that server. The Management Components are also extensible to support the management of third party services as described below.

Preferably, clients need only create and initialize an MCDomain or equivalent object for an application service domain to discover all the application servers in that domain. In a preferred embodiment, clients can directly create instances of any Management Components class as required.

The Management Components as described herein are extensible to support the management of third party background processes written for a particular operating system, for example, third-party Windows NT services. In order to integrate a third party service into the Management Components framework, a corresponding interface component, e.g., a COM component, must be provided that implements the IMCService or its equivalent interface, such as interface 132 of class diagram 130 of FIG. 2. It will also typically be necessary to provide access to the interface by client components, for example, by adding appropriate values to a registry key. This registry key may, in a Windows implementation of the subject invention, appear as HKEY_LOCAL MACHINE\SOFTWARE\<Installed Enterprise Application/ Management Components\<Version>\Service Classes, or an equivalent. IMCService or equivalent interface pointers to registered third party service components would in this way be accessible to clients by their automatic inclusion in the IMCServer.Services or equivalent collection.

In an alternate embodiment of the subject invention, XML may be incorporated into the Management Components and extended to arrive at a consistent solution for version and inventory information, including aggregation of network or server properties or statistics. Preferably, the common <service> root element is used for all XML service properties and statistics, thus supporting several possible extensions to the current model. For example, in an alternate embodiment of the present invention, properties or statistics reports may be aggregated across several services. Alternatively, tags such as <server> and <domain> may be introduced to XML documents to aggregate properties or statistics across multiple servers and domains.

Virtually any XML design project necessitates a design decision regarding whether to use elements or attributes in implementing a XML document. An element is a section of an XML document defined by start- and end-tags (or an empty tag); while an attribute provides information about elements—an attribute is a property of an XML tag which is a named characteristic of the tag. In a preferred embodiment of the present invention, elements may be used to represent anything ultimately intended for presentation to a user, while attributes may be used in support of programmatic parsing or in cases requiring unique identification of elements.

Also in a preferred embodiment of the present application, network performance statistical units relevant to network administration may be embedded into XML tag names, rather than representing units as XML attributes. It is believed that this aids in human reference and readability, simplifying code maintenance and debugging. For example, tag names according to one embodiment of the present invention may be <itemAge_days>, <pollInterval_seconds>, and <maxTx-Time_msec>.

XML data types described in this section such as int, boolean, string, and dateTime are consistent with the data types supported by a standard XML parser application that may run on a server remotely, providing instructions and data to a remote server. In a preferred embodiment of the invention, wherein a standard markup language is used, e.g., in the case of XML, any standard XML parser, e.g. Microsoft's msxml.dll dynamic linked library file can be used to process the XML consumed and emitted by the Management Components.

In one embodiment of the present invention, applicable to remote management of services, XML may be used to represent service properties. In this embodiment, some or all of the COM interface properties may be eliminated, implemented instead as XML properties accessible through a single generic COM interface property.

In a preferred embodiment of the subject invention, encapsulated reusable interfaces, for example, COM interface properties, may be used for properties and status that are potentially applicable to all background services. Preferably, a markup language, e.g., XML, may be used for properties or statistics that are specific to one or a very few background properties, such as NT services.

In an embodiment of the subject invention in which XML is incorporated into the Management Components, it is thought to be preferable to use a common <service> root element for all markup language, e.g. XML, service properties and statistics. This structure supports several possible extensions to the current model. In order to further reduce network overhead and traffic, it may also prove desirable to aggregate properties or statistics reports across several services. In one embodiment of the present invention, this may be done by introducing tags such as <server> and <domain> into the markup language code, in order to aggregate properties or statistics across multiple servers and domains.

In a preferred embodiment of the subject invention, markup version information, e.g. XML version information may be derived from a software Management Component. The availability of version information is anticipated to aid in software maintenance and debugging, as well as future extensibility.

XML service properties will preferably be readable regardless of whether the corresponding service is running. While most service properties are modifiable; some are read-only. Typically, service properties generally persist until the next session. Runtime changes to some modifiable properties take effect dynamically, while changes to others do not take effect until the service is restarted. By way of example, for a COM-based implementation of the present invention as depicted in the class diagram of FIG. 2, service properties can be read using the IMCService.GetProperties method and modified using the IMCService.SetProperties method. Preferably, service properties implemented according to the present invention take effect dynamically without requiring a service restart. These methods, for example, accept and return XML strings representing collections of service properties. In this embodiment, XML provides a means of agent application programming, utilizing COM automation, without binary stream parsing or proprietary encoding at the client level. Instead, an easily modifiable, maintainable, and easily debugged transmission medium is provided, allowing for specification of a subset or group of network properties or statistics to retrieve with a given XML document, providing batched statistical transmissions, conserving network bandwidth and compensating for the increased size of XML documents compared to binary streams.

XML service statistics obtained according to the present invention may be described generally as read-only snapshots of dynamically changing data. They will typically be available only when the corresponding service is running. Statistics can be read, in the embodiment depicted in FIG. 2, using the IMCService.GetStatistics or equivalent method.

In a preferred embodiment of the present invention when implemented utilizing COM components, all Management Component classes support standard COM error handling by implementing the COM interface ISupportErrorInfo. If alternative encapsulated reusable interface modules are used, preferably existing error handling aspects of these interfaces will be utilized as well. In the COM case, this allows Visual Basic client programmers to utilize the standard VB error handling mechanisms such as the Err object in client applications that call the Management Components. The Management Component interfaces may generate both standard Microsoft-defined HRESULT codes and application-defined HRESULT codes. Application-defined HRESULT codes all have the facility bits set to FACILITY_ITF to indicate that these HRESULTs have meanings specific to these interfaces.

In a preferred embodiment of the subject invention, the Management Component interfaces may be configured to return standardized runtime error codes. For example, in an embodiment of the subject invention adapted for administration of a Windows NT server or network, the Management Component interfaces may preferably return any of the standard Microsoft-defined HRESULT codes, e.g., E_NOTIMPL; E_POINTER; DISP_E_EXCEPTION, or other standard HRESULT runtime error codes.

It is preferable that in implementing the present invention particularly in a Microsoft environment, application-defined HRESULT codes have corresponding message text stored in a message table resource, such as that found in the file esmcres.dll. In order to support localized remote clients, the server-side Management Components will preferably not write error message text to the Description property of the COM error objects returned to clients. Instead, clients may retrieve error descriptions for Management Components-defined error codes from a local copy of esmcres.dll via the Win32 API function FormatMessage. It is typically preferred that in implementing the Management Component interfaces, support for localizable clients will be implemented without requiring translation of the Management Components themselves, through the XML facility afforded by the present invention.

In implementing the present invention in a COM embodiment, and according to the class diagram of FIG. 2, it will generally be preferred that the certain strings are localizable in the Management Components resource DLL (e.g., esmcres.dll), such as values for all <displayName> elements returned in XML streams from the IMCService.GetProperties and IMCService.GetStatistics methods; values for the certain XML elements returned via the IMCDomain.MCVersionXML, IMCServer.MCVersionXML, and IMCService.MCVersionXML properties, including \\versionInfo\vendor, \\versionInfo\product, \\versionInfo\component, and \\versionInfo\copyright; and the names of the predefined Management Components MTS roles: Administrator and Viewer.

Further considering a COM-based embodiment of the present invention, as depicted in FIG. 2, the Management Components preferably exploit MTS package security. For example, it is possible for the Management Components to predefine multiple MTS roles, e.g., Administrator and Viewer. The Administrator role implicitly includes Viewer permissions. The Management Components will preferably programmatically implement method-level security based on these predefined MTS roles.

The present invention preferably provides for XML service statistics to be provided to a network administrator remotely. XML service statistics are preferably implemented as read-only snapshots of dynamically changing data regarding network performance and status. In the COM-based implementation depicted in the class diagram of FIG. 2, statistics can be read using the IMCService.GetStatistics method or an equivalent.

In an embodiment of the present invention, a design decision which must typically be made is the access privileges to be granted to method-level processes implementing the Management Components agents. In the embodiment of the present invention depicted in the class diagram of FIG. 2, for example, it is preferable that the following Management Component properties and methods allow access by both the Viewer and Administrator roles, in addition to all IMCDomain properties: IMCServer.ServerName, IMCServer.ComputerName, IMCServer.DomainName, IMCServer.IsDomainController, IMCServer.Services, IMCServer.CommonFilePath (read only), IMCServer.CurrentTime, IMCServer.TimeZone, IMCServer.MCVersionXML, IMCService.ServiceName, IMCService.DisplayName, IMCService.Status, IMCService.AcceptPause, IMCService.Server, IMCService.ExeFile, IMCService.StartMode (read only), IMCService.AccountName, IMCService.LastStartTime, IMCService.InstallDate, IMCService.ServiceVersionXML, IMCService.MCVersionXML, IMCService.GetProperties, IMCService.GetStatistics, and IMCService.FlushLog. In contrast, in a COM-based implementation of the present invention, the following Management Component properties and methods preferably allow access by the Administrator role only, IMCServer.CommonFilePath (write), IMCService.StartMode (write), IMCService.Start, IMCService.Stop, IMCService.Pause, IMCService.Continue, IMCService.SetAccount, IMCService.SetProperties, IMCService.ResetStatistics, IMCRendezvousMgr.RendezvousNow, and all IMCObjectMgr methods.

In a preferred embodiment, upon implementation of a COM-based implementation of the present invention as depicted in the class diagram of FIG. 2, the Management Components allow multiple clients to concurrently utilize instances of an MC class on a server by implementing a caching model for service properties based on optimistic concurrency. This prevents race conditions and access violations of a single MC class by multiple clients. According to this embodiment, service properties may be cached separately for each MTS activity id. (Note that a new activity id will typically be generated each time a client directly creates a Management Components object. All cached properties will preferably persist until the MTS package is deactivated.

Therefore, frequent creation of new MC objects by a client may result in excessive memory consumption. This will preferably be avoided by reusing existing MC object references as is provided in a preferred embodiment. The details on MTS activity ids may be reviewed in documentation available from Microsoft Corporation of Redmond, Wash. Accordingly, it will typically be preferred in implementing the present invention that, for example in the implementation depicted in FIG. 2, calls to IMCService.SetProperties or the equivalent on any of the MC service classes will preferably block other concurrent IMCService.SetProperties calls (but not IMCService.GetProperties calls) across all instances of the same MC class on the same server. Calls to IMCService.GetProperties or its equivalent are preferably nonblocking.

For each indicated property, IMCService.GetProperties or the equivalent preferably checks the timestamp of the corresponding cached value in the cache associated with the current activity ID. In one embodiment of the present invention, cached values less than 5 seconds old are returned to the caller without being refreshed. Cached values 5 seconds old or older are refreshed before being returned to the caller.

To avoid scenarios in which a user might make modifications based on obsolete information, it is preferred that an interface methods such as IMCService.SetProperties, of interface 132 of class diagram 130, crosschecks the cached value for each indicated property in the cache associated with the current activity ID against the underlying registry value on the server. If one or more cached properties are determined in this way to be obsolete at any point during the SetProperties operation, those properties are preferably not modified and the method returns error 0xC0042000 (one or more properties could not be set). In this event, the associated XML error may list indicates error 0xC0042009 for those properties with obsolete cached values. For example, IMCService.SetProperties or equivalent may be configured in one embodiment to attempt to set all indicated properties even if one or more fail. IMCService.SetProperties or equivalent always refreshes the cache associated with the current activity ID for all indicated properties.

In a preferred embodiment of the subject invention, the management components implemented in the present invention provide the information, in the form of XML strings, about the network being monitored and about background processes available on the server being monitored. For example, the Management Components of the subject invention preferably provide XML strings that provide information about, for example, the network server service version, the Management Component version, service-specific properties, and service-specific statistics Any standard XML parser such as Microsoft's (msxml.dll) is thought to be suitable for use to implement the XML aspect if selected of the present invention; and thus to be used to process the XML consumed and emitted by the Management Components. Specifically, XML data types described in this section such as int, boolean, string, and dateTime are consistent with the data types supported by the Microsoft XML parser.

In an embodiment of the present invention utilizing COM components in a Windows operating system environment, preferably the IMCDomain.Servers property returns a collection of strings (server names) rather than a collection of COM interface pointers to instantiated MCServer objects. (This stands in contrast to the IMCServer.Services method, which returns a collection of interface pointers to objects instantiated on the same machine as the MCServer object.) Although this approach typically requires the client programmer to then explicitly create MCServer objects remotely on the named servers, it may be preferable in order to support the scenario in which one or more servers in the domain are down. Objects cannot be instantiated on inactive servers, but inactive server names do appear in the returned collection, enabling the client programmer to detect this situation and present the information accordingly to the user if desired.

In a preferred embodiment, XML service properties can generally be read regardless of whether the corresponding service is running. Most service properties are modifiable; some are read-only. Service properties generally persist until the next session. Runtime changes to some modifiable properties take effect dynamically, while changes to others do not take effect until the service is restarted.

Appendices A-F are computer program listing appendixes incorporated by reference that provide examples of source code, XML design tables, and interface definitions thought suitable to implement certain aspects of the present invention, for example, in the Visual Basic language.

Appendix A illustrates commented source code thought to be suitable to start all background processes, or "services," on a Windows NT server.

Appendix B illustrates an implementation of a routine to obtain the background process name and status for Services running on a Windows NT server.

Appendix C illustrates an implementation of a routine to retrieve, parse, and display certain XML statistics about a service attendant to managing the service according to the present invention.

Appendix D shows an implementation of a routine to set XML properties for a server background process, and handle errors returned by a server, for a Windows NT server and its services.

Appendix E describes interfaces thought to be suitable for implementation of a representative embodiment of the present invention. The interfaces are provided in a language-neutral fashion, according to IDL (Interface Definition Language) types. Syntax examples are in Visual Basic.

Appendix F provides XML documents thought to be suitable for implementation of the present invention in a Windows environment, together with corresponding element tables for each document the contents and attributes of each element type.

Appendix G provides tables showing potential registry keys and values in an implementation of the subject invention in a Windows environment using COM objects.

The invention has been described in detail with particular reference to certain preferred embodiments thereof, but it will be understood that variations and modifications can be effected within the scope of the invention. In particular, variations in the operating system or hardware type of the server being managed, or in the programming language or markup language are contemplated within the scope of the invention, although particular elements of these types have been used for illustrative purposes. Similarly, classes, objects, and methods may be replaced by corresponding elements with equivalent functions even though the elements may be renamed.

APPENDIX A

```
' Create an MCDomain object
Dim objDomainAgent As ESMC.IMCDomain
Set objDomainAgent = CreateObject ("ESMC.MCDomain", txtDomain.Text)
' Set the domain name. This must be done before referencing
' other IMCDomain properties.
objDomainAgent.DomainName = txtDomain.Text
' Get the list of servers on the domain
Dim varServers As Variant
```

APPENDIX A-continued

```
varServers = objDomainAgent.Servers
' For each server get the list of services on that server
Dim varServer As Variant
Dim objServerAgent As ESMC.IMCServer
For Each varServer In varServers
    ' Create an MCServer object
    Set objServerAgent = CreateObject("ESMC.MCServer", varServer)
    ' Get the list of services on the server
    Dim varServices As Variant
    varServices = obj ServerAgent.Services
    ' Start each service
    Dim varService As Variant
    For Each varService In varServices
        varService.Start
    Next
    Set objServerAgent = Nothing
Next
Set objDomainAgent = Nothing
```

APPENDIX B

```
' Clear the VB ListBox object
lstServices.Clear
' Get the name of the server from a VB TextBox
Dim varServer As Variant
varServer = txtDomain.Text
' Create an MCServer object
Dim objServerAgent As ESMC.IMCServer
Set objServerAgent = Createobject("ESMC.MCServer", varServer)
' Get the list of services on the server
Dim varServices As Variant
varServices = obj ServerAgent.Services
' For each service, get the ServiceName and the
' service's status. Write these to the VB ListBox.
Dim varService As Variant
    For Each varService In varServices
        ' Call the ServiceName property
        Dim strServiceName As String
        strServiceName = varService.ServiceName
        ' Call the Status property
        Dim lngServiceStatus As Long
        lngServiceStatus = varService.Status
        ' Call a helper function to map the status to a string.
        ' For example, mcServiceRunning becomes "Running"
        Dim strServiceStatus As String
        strServiceStatus = ServiceStatusString (varService.Status)
        ' Create a string for displaying.
        Dim strMessage As String
        strMessage = strServiceName & vbTab & "("&
strServiceStatus & ")"
        ' Add the string to the ListBox
        lstServices.AddItem strMessage
Next
Set objServerAgent = Nothing
```

APPENDIX C

```
Private Sub GetIndexStatistics( )
    On Error GoTo ErrHandler
    ' The number of statistics retrieved
    Dim lngNumStatistics As Long
    ' The name of each statistic retrieved
    Dim strStatNames( ) As String
    ' The count value for each statistic retrieved
    Dim strStatCount( ) As String
    ' The base time from which statistics are measured
    Dim dtmBaseTime As Date
    ' General variables
    Dim intStatsLength As Integer
    Dim i As Integer
    Dim j As Integer
    ' The XML string returned from the Service
    Dim strXMLStatistics As String
    ' ESMC variables
```

APPENDIX C-continued

```
Dim objDomain As IMCDomain
Dim objIndexService As IMCService
'MSXML variables
Dim objXMLdoc As New MSXML.DOMDocument
Dim objIDXStats As MSXML.IXMLDOMNodeList
Dim objIDXStat As MSXML.IXMLDOMNode
Dim objStatProperties As MSXML.IXMLDOMNodeList
Dim objStatProperty As MSXML.IXMLDOMNode
Dim objServerBaseTime As MSXML.IXMLDOMNodeList
' Get IMCDomain
Set objDomain = CreateObject ("ESMC.MCDomain",
txtDomainName.Text)
    objDomain.DomainName = txtDomainName.Text
    ' Get IMCService for Index Manager
    Set objIndexService = objDomain.IndexService
    ' Determine if service is running
    If (objIndexService.Status <> mcServiceRunning) Then
        MsgBox "IndexService not running."
        Exit Sub
    End If
    ' Get the XML statistics from the IndexService
    strXMLStatistics = objIndexService.GetStatistics
    ' Load the XML string into the Microsoft XML Parser
    objXMLdoc.loadXML strXMLStatistics
    ' Get the base time
    ' Set objServerBaseTime = objXMLdoc.getElementsByTagName
("baseTime")
    If objServerBaseTime.length >= 1 Then
        Dim strBaseTimeStr As String
        Dim strLeft As String
        Dim strRight As String
        ' There can only be one base time tag
        strBaseTimeStr = objServerBaseTime.Item(0).Text
        strLeft = Left(strBaseTimeStr, InStr(strBaseTimeStr, "T") – 1)
        strRight = Right(strBaseTimeStr, Len(strBaseTimeStr) – _
            InStr(strBaseTimeStr, "T"))
        dtmBaseTime = strLeft & " " & strRight
    End If
    ' Get the index statistics
    Set objIDXStats = objXMLdoc.getElementsByTagName("txType")
    ' Get the number of statistics and ReDim the statistics arrays
    lngNumStatistics = obj IDXStats.length
    ReDim strStatNames (lngNumStatistics)
    ReDim strStatCount (lngNumStatistics)
    ' Fill up the statistics arrays
    For i = 0 To lngNumStatistics – 1
        ' Process one statistic
        Set objIDXStat = objIDXStats(i)
        Set objStatProperties = objIDXStat.childNodes
        For j = 0 To objStatProperties.length – 1
            Set objStatProperty = objStatProperties(j)
            ' We are just looking for the name and count properties
            ' and skipping others.
            If objStatProperty.nodeName = "displayName" Then
                strStatNames (i) = objStatProperty.Text
            ElseIf objStatProperty.nodeName = "count" Then
                strStatCount (i) = objStatProperty.Text
            End If
        Next
    Next
    ' Now let's display the name and count for each statistic
    ' in a VB ListBox
    lstStats.Clear
    lstStats.AddItem dtmBaseTime
    For i = 1 To lngNumStatistics
        Dim strStat As String
        strStat = strStatNames(i) & " " & strStatCount(i)
        lstStats.AddItem strStat
    Next i
    Exit Sub
ErrHandler:
    MsgBox Err.Description
End Sub
```

APPENDIX D

```
Public Sub SetIdxProperties( )
    On Error GoTo ErrHandler
    ' ESMC variables
    Dim objServerAgent As ESMC.IMCServer
    Dim varServices As Variant
    ' Create an IMCServer object and get the list of services
    Set obj ServerAgent = CreateObject ("ESMC.MCServer",
txtServerName.Text)
    varServices = objServerAgent.Services
    ' Loop through the services until we find the IndexManager
    Dim varService As Variant
    For Each varService In varServices
        If (varService.ServiceName = "IndexManager") Then
            ' We will set three properties,
            '   indexOption = BADVALUE - - caught by error handler below
            '   exceptionClasses = CLASS1
            '   createLocatorRecord = 1
            varService.SetProperties ( _
                "<service name='IndexManager'>" & _
                    "<properties>" & _
                        "<indexOption>BADVALUE</indexOption>" & _
                        "<exceptionClasses>" & _
                            "<class name='CLASS1'>" & _
                                "<displayName>CLASS1</displayName>" & _
                            "</class>" & _
                        "</exceptionClasses>" & _
                        "<createLocatorRecord>1</createLocatorRecord>" & _
                    "</properties>" & _
                "</service>")
            Exit For
        End If
    Next
    Exit Sub
ErrHandler:
```

APPENDIX D-continued

```
                ' Because IMCServices.SetProperties supports the bulk modification
of
                ' many properties at once using XML, it is possible that multiple
                ' errors may occur on a single call. In the event that one or more
                ' properties cannot be set, IMCService.SetProperties generates an
                ' error of &HC0042000. The Description property of the Err object
                ' contains an XML string listing the detailed errors that occurred
                ' and for which properties.
                If (Err.Number = &HC0042000) Then
                        'MSXML variables used for parsing the XML
                    Dim objXMLdoc As New MSXML.DOMDocument
                    Dim objXMLAllErrors As MSXML.IXMLDOMNodeList
                    Dim objXMLOneError As MSXML.IXMLDOMNode
                    ' Err.Description contains an XML string listing the error(s)
                    ' Load this into the XML parser.
                    objXMLdoc.loadXML Err.Description
                    ' Get the collection of "error" elements
                    Set objXMLAllErrors = objXMLdoc.getElementsByTagName("error")
                    ' Get the total number of errors returned
                    Dim lngNumErrors As Long
                    lngNumErrors = objXMLAllErrors.length
                    ' Examine the value of each error.
                    Dim i As Integer
                    For i = 0 To lngNumErrors - 1
                        Set objXMLOneError = objXMLAllErrors.Item(i)
                        ' Get the error number (in string format)
                        Dim strErrorNum As String
                        strErrorNum = objXMLOneError.Attributes.Item(0) .nodeValue
                        ' Change the "0x" to "&H" for VB HEX syntax of the value
                        Mid(strErrorNum, 1, 2) = "&H"
                        Dim intErrorNum As Integer
                        ' Convert the error string to an integer
                        intErrorNum = CInt(strErrorNum)
                        ' Handle each error individually
                        Select Case intErrorNum
                            Case &HC0042011
                                MsgBox "Invalid index option value", vbExclamation
                            ' Add additional cases here.
                        End Select
                    Next i
                Else
                    ' Some other error
                    gErrorHandler
                End If
            End Sub
```

APPENDIX E

IMCDomain
Properties

DomainName

| | |
|---|---|
| Description | The name of the domain associated with this instance. |
| Usage | Domain Object.DomainName [ = domain name] |
| Type | BSTR |
| Writable | yes |
| Access | Viewer to both read and write |
| Remarks | Constructed as NULL. The client must set the DomainName property to a valid domain name before referencing other IMCDomain properties. The domain name must be an IP host name of the ENTERPRISE APPLICATION domain controller for that domain in order to be valid. If the following registry value is set on the local machine, the specified domain must be included in this list or the property set operation will fail: HKEY_LOCAL_MACHINE\SOFTWARE\Kodak\Management Components\<Version>\Domains |

Servers

| | |
|---|---|
| Description | A collection of server names for all ENTERPRISE APPLICATION servers in the associated ENTERPRISE APPLICATION domain. |
| Usage | DomainObject.Servers |
| Type | SAFEARRAY of BSTR |
| Writable | no |
| Access | Viewer |
| Remarks | The Servers collection includes exactly one element for each server listed in any of the following registry values under the <ESWM Root Key>\COMMON |

APPENDIX E-continued key on the domain controller, as well as one element for the domain controller itself.
CHILD SERVERS
INDEX
LOCATOR
RENDEZVOUS SERVERS
SECURITY DomainController

| | |
|---|---|
| Description | The IMCServer interface pointer for the ENTERPRISE APPLICATION domain controller of the associated ENTERPRISE APPLICATION domain. |
| Usage | DomainObject.DomainController |
| Type | IMCServer * |
| Writable | no |
| Access | Viewer |

IndexService

| | |
|---|---|
| Description | The IMCService interface pointer for the ENTERPRISE APPLICATION Index Manager service for the associated ENTERPRISE APPLICATION domain. |
| Usage | DomainObject.IndexService |
| Type | IMCService * |
| Writable | no |
| Access | Viewer |

SecurityService

| | |
|---|---|
| Description | The IMCService interface pointer for the ENTERPRISE APPLICATION Security Manager service for the associated ENTERPRISE APPLICATION domain. |
| Usage | DomainObject.SecurityService |
| Type | IMCService * |
| Writable | no |
| Access | Viewer |

LocationService

| | |
|---|---|
| Description | The IMCService interface pointer for the ENTERPRISE APPLICATION Location Manager service for the associated ENTERPRISE APPLICATION domain. |
| Usage | DomainObject.LocationService |
| Type | IMCService * |
| Writable | no |
| Access | Viewer |

MCVersionXML

| | |
|---|---|
| Description | An XML string containing version information for the component implementing this interface. |
| Usage | DomainObject.MCVersionXML |
| Type | BSTR |
| Writable | no |
| Access | Viewer |

Methods

The IMCDomain interface contains no methods.

IMCServer
Properties

ServerName

| | |
|---|---|
| Description | The IP host name of the associated ENTERPRISE APPLICATION server. |
| Usage | ServerObject.ServerName |
| Type | BSTR |
| Writable | no |
| Access | Viewer |
| Remarks | This value is taken from the following registry value on the server:<br><ESWM Root Key>©OMMONßERVER |

ComputerName

| | |
|---|---|
| Description | The NetBIOS name of the associated server machine. |
| Usage | ServerObject.ComputerName |
| Type | BSTR |
| Writable | no |
| Access | Viewer |
| Remarks | This value is obtained from the Win32 API GetComputerName. |

DomainName

| | |
|---|---|
| Description | The name of the domain that includes this server instance. |
| Usage | ServerObject.DomainName |
| Type | BSTR |
| Writable | no |
| Access | Viewer |

APPENDIX E-continued

Remarks — This value is taken from the following registry value on the server:
<ESWM Root Key>©OMMON[D]OMAIN

IsDomainController

| | |
|---|---|
| Description | A boolean value indicating whether this server instance is the controller for its Domain. |
| Usage | ServerObject.IsDomainController |
| Type | VARIANT_BOOL |
| Writable | no |
| Access | Viewer |
| Remarks | This value is taken from the following registry value on the server: <ESWM Root Key>©OMMON©ONTROL |

CommonFilePath

| | |
|---|---|
| Description | The common path for ENTERPRISE APPLICATION service diagnostic files on the associated server. |
| Usage | ServerObject.CommonFilePath [ = path ] |
| Type | BSTR |
| Writable | yes |
| Access | Viewer to read, Administrator to write |
| Remarks | When CommonFilePath is read, the returned value is taken from the following registry value on the server: <ESWM Root Key>©OMMONflOG_DIR When CommonFilePath is set, the specified value is applied verbatim to the registry on the server. Changes to CommonFilePath will not take effect until the ENTERPRISE APPLICATION services on the server are restarted. |

CurrentTime

| | |
|---|---|
| Description | The current date and time on the associated server. |
| Usage | ServerObject.CurrentTime |
| Type | DATE |
| Writable | no |
| Access | Viewer |

TimeZone

| | |
|---|---|
| Description coordinated universal time (UTC) and server local time. | The time zone of the associated server, expressed as the difference between |
| Usage | ServerObject.TimeZone |
| Type | DATE |
| Writable | no |
| Access | Viewer |
| Remarks | Add TimeZone to CurrentTime or to a server-local timestamp to get UTC time on the server. This can be useful for comparing timestamps originating in different time zones. The TimeZone value reflects any applicable daylight savings time offset. Note that TimeZone is a time interval expressed as fractional days, not an absolute time, and is therefore not generally suitable for display purposes without conversion. TimeZone may have positive or negative sign. |

MCVersionXML

| | |
|---|---|
| Description | An XML string containing version information for the component implementing this interface. |
| Usage | ServerObject.MCVersionXML |
| Type | BSTR |
| Writable | no |
| Access | Viewer |

InventoryXML

Services

| | | |
|---|---|---|
| Description | Returns a collection of IMCService interface pointers for all ENTERPRISE APPLICATION services and registered third party services on the associated server machine. | |
| Syntax | ServerObject.Services( MissingServices ) | |
| Parameters | VARIANT[OUT] MissingServices | On return, contains a space-delimited string of services that are managed but not registered with the SCM (see remarks below). In the normal case when services are consistently configured in the registry and the SCM, this parameter returns empty. |

APPENDIX E-continued

| | |
|---|---|
| Return Type | SAFEARRAY of IMCService * |
| Writable | no |
| Access | Viewer |
| Remarks | The returned collection includes exactly one element for each ENTERPRISE APPLICATION service that satisfies both of the following criteria:<br>    The ENTERPRISE APPLICATION service is indicated for this server according to the following registry values under the <ESWM Root Key>\COMMON key on the domain controller[1].<br>    CHILD SERVERS[2]<br>    INDEX<br>    LOCATOR<br>    RENDEZVOUS SERVERS<br>    SECURITY<br>    The ENTERPRISE APPLICATION service is found in the local SCM database.<br>The returned collection also includes exactly one element for each third party (non-ENTERPRISE APPLICATION) service that satisfies both of the following criteria:<br>    The third party service is listed under the following registry key on the server:<br>    HKEY_LOCAL_MACHINE\SOFTWARE\Kodak\ Management Components\<Version>\Service Classes<br>    The third party service is found in the local SCM database.<br>Calling the Services method results in the instantiation of the corresponding Management Components classes on the server. The Service Classes registry key determines which class id to instantiate for each service name. If a ENTERPRISE APPLICATION service is indicated for this server according to the above criteria but is not listed under the Service Classes registry key, then a hard coded default class id is instantiated according to the service name. Third If a service is not found in the local SCM database but is otherwise indicated for this server according to the above criteria, then Services generates error 0x00000001 (S_FALSE) to indicate that one or more expected services were not found on the server.[3] In this case, a usable collection of IMCService interface pointers will still be returned for all indicated services that were found on the server, and the caller will also receive a COM error object whose Description property contains a space-delimited list of service names that were expected but not found. |

<div align="center">IMCService<br>Properties</div>

ServiceName

| | |
|---|---|
| Description | The service name registered in the SCM on the server for the associated service. |
| Usage | ServiceObject.ServiceName |
| Type | BSTR |
| Writable | no |
| Access | Viewer |
| Remarks | The service name is the locally unique identifier for the service. |

DisplayName

| | |
|---|---|
| Description | The display name registered in the SCM on the server for the associated service. |
| Usage | ServiceObject.DisplayName |
| Type | BSTR |
| Writable | no |
| Access | Viewer |
| Remarks | The display name is generally used in user interfaces to identify the service. |

Status

| | |
|---|---|
| Description | The status of the associated service. |
| Usage | ServiceObject.Status |
| Type | ServiceStatusConstants:<br>mcServiceUnknown<br>mcServiceStopped<br>mcServiceStartPending<br>mcServiceStopPending<br>mcServiceRunning<br>mcServiceContinuePending<br>mcServicePausePending<br>mcServicePaused<br>mcServiceRunningNotOperational<br>mcServiceNotInstalled |
| Writable | no |
| Access | Viewer |
| Remarks | The following Management Components constants respectively evaluate to the corresponding Win32 constants: |

APPENDIX E-continued

| Management Components Constants | Win32 Constants |
|---|---|
| mcServiceStopped | SERVICE_STOPPED |
| mcServiceStartPending | SERVICE_START_PENDING |
| mcServiceStopPending | SERVICE_STOP_PENDING |
| mcServiceRunning | SERVICE_RUNNING |
| mcServiceContinuePending | SERVICE_CONTINUE_PENDING |
| mcServicePausePending | SERVICE_PAUSE_PENDING |
| mcServicePaused | SERVICE_PAUSED | mcServiceUnknown indicates an unknown service status.
mcServiceRunningNotOperational indicates that the service is running but an error condition is impeding normal operation.
mcServiceNotInstalled indicates that the service is not found in the SCM database on the server. In this case, only the following IMCService properties (and no methods) will be valid: ServiceName, Status, Server, and MCVersionXML.

AcceptPause

| | |
|---|---|
| Description | A boolean value indicating whether the associated service can be paused. |
| Usage | ServiceObject.AcceptPause |
| Type | VARIANT_BOOL |
| Writable | no |
| Access | Viewer |

Server

| | |
|---|---|
| Description | The IMCServer interface pointer for the server hosting the associated service. |
| Usage | ServiceObject.Server |
| Type | IMCServer * |
| Writable | no |
| Access | Viewer |

ExeFile

| | |
|---|---|
| Description | The fully qualified path and filename for the associated service executable. |
| Usage | ServiceObject.ExeFile |
| Type | BSTR |
| Writable | no |
| Access | Viewer |

StartMode

| | |
|---|---|
| Description | The start mode registered in the SCM on the server for the associated service. |
| Usage | ServiceObject.StartMode [ = StartMode ] |
| Type | ServiceStartModeConstants: mcServiceAutoStart mcServiceDemandStart mcServiceDisabled |
| Writable | yes |
| Access | Viewer to read, Administrator to write |
| Remarks | Changes to StartMode will not take effect until the ENTERPRISE APPLICATION service is restarted. These constants respectively evaluate to the corresponding Win32 constants: SERVICE_AUTO_START SERVICE_DEMAND_START SERVICE_DISABLED |

AccountName

| | |
|---|---|
| Description | The Windows NT account name registered in the SCM on the server for the associated service. |
| Usage | ServiceObject.AccountName |
| Type | BSTR |
| Writable | no |
| Access | Viewer |

LastStartTime

| | |
|---|---|
| Description | The date and time on the server that the associated service was last started. |
| Usage | ServiceObject.LastStartTime |
| Type | DATE |
| Writable | no |
| Access | Viewer |
| Remarks | This value is taken from the following registry value on the server: <ESWM Root Key>\<service key>\LastStartTime |

InstallDate

| | |
|---|---|
| Description | The date and time on the server that the associated service was installed. |
| Usage | ServiceObject.InstallDate |
| Type | DATE |
| Writable | no |
| Access | Viewer |

APPENDIX E-continued

| | |
|---|---|
| Remarks | This value is taken from the following registry value on the server:<br><ESWM Root Key>\<service key>\InstallDate |

ServiceVersionXML

| | |
|---|---|
| Description | An XML string containing version information for the associated service. |
| Usage | ServiceObject.ServiceVersionXML |
| Type | BSTR |
| Writable | no |
| Access | Viewer |

MCVersionXML

| | |
|---|---|
| Description | An XML string containing version information for the component implementing this interface. |
| Usage | ServiceObject.MCVersionXML |
| Type | BSTR |
| Writable | no |
| Access | Viewer |

Methods

Start

| | |
|---|---|
| Description | Starts the associated service. |
| Syntax | ServiceObject.Start |
| Return Type | none |
| Access | Administrator |
| Remarks | Succeeds if the service starts successfully or is already running. |

Stop

| | |
|---|---|
| Description | Stops the associated service. |
| Syntax | ServiceObject.Stop |
| Return Type | none |
| Access | Administrator |
| Remarks | Succeeds if the service stops successfully or is already stopped. |

Pause

| | |
|---|---|
| Description | Pauses the associated service. |
| Syntax | ServiceObject.Pause |
| Return Type | none |
| Access | Administrator |
| Remarks | Succeeds if the service pauses successfully or is already in a paused state. Fails if the service is stopped or if the service cannot be paused. |

Continue

| | |
|---|---|
| Description | Continues the associated service. |
| Syntax | ServiceObject.Continue |
| Return Type | none |
| Access | Administrator |
| Remarks | Fails if the service is not pausable or is not active. For pausable services, succeeds if the service continues successfully or is already active. |

SetAccount

| | | |
|---|---|---|
| Description | Sets the Windows NT account name and password registered in the SCM on the server for the associated service. | |
| Syntax | ServiceObject.SetAccount( Name, Password ) | |
| Parameters | BSTR Name | A valid Windows NT account name on the server. |
| | BSTR Password | The password associated with the account name specified by the Name parameter. |
| Return Type | none | |
| Access | Administrator | |
| Remarks | Changes will not take effect until the ENTERPRISE APPLICATION service is restarted. The account name and password must correspond to a valid Windows NT account on the server. The MCService class does not perform any verification on these values. | |

GetProperties

| | | |
|---|---|---|
| Description | Returns an XML string containing service-specific property values for the associated service. | |
| Syntax | ServiceObject.GetProperties<br>or<br>ServiceObject.GetProperties( PropertiesXML ) | |
| Parameters | BSTR PropertiesXML | An optional string parameter consisting of an XML document indicating the subset of properties to return. Defaults to an empty string. If an empty string is specified, all properties for the associated |

APPENDIX E-continued

|  |  |  |
|---|---|---|
|  | service are returned.<br>Unrecognized properties<br>are<br>ignored. |  |
| Return Type | BSTR |  |
| Access | Viewer |  |
| Remarks | The MCOmniKernel class does not implement this method. |  |
| SetProperties |  |  |
| Description | Sets service-specific property values for the associated service. |  |
| Syntax | ServiceObject.SetProperties( PropertiesXML ) |  |
| Parameters | BSTR PropertiesXML | An XML string indicating one or more property values to set for the associated service. Unrecognized properties are ignored. |
| Return Type | none |  |
| Access | Administrator |  |
| Remarks | The MCOmniKernel class does not implement this method.<br>See below for a description of the relevant XML syntax. This method returns error 0xC0042000 if one or more properties cannot be set. In this event, the Description property of the associated COM error object contains an XML string listing the detailed errors that occurred and for which properties. See below for a detailed description of XML error lists. This method attempts to set all the indicated properties even if one or more fail. See below for a description of the concurrency model. |  |
| GetStatistics |  |  |
| Description | Returns an XML string containing service-specific statistics for the associated service. |  |
| Syntax | ServiceObject.GetStatistics<br>or<br>ServiceObject.GetStatistics( StatisticsXML ) |  |
| Parameters | BSTR StatisticsXML | An optional string parameter consisting of an XML document indicating the subset of statistics to return. Defaults to an empty string. If an empty string is specified, all statistics for the associated service are returned. Unrecognized statistics are ignored. |
| Return Type | BSTR |  |
| Access | Viewer |  |
| Remarks | The following classes do not currently implement this method:<br>MCLocationMgr, MCOmniKernel, MCRouteEngine, MCSecurityMgr, MCObjectMgr. |  |
| ResetStatistics |  |  |
| Description | Resets the base time for statistics for the associated service to the current time on the server. |  |
| Syntax | ServiceObject.ResetStatistics |  |
| Return Type | none |  |
| Access | Administrator |  |
| Remarks | ResetStatistics has the effect of resetting all count statistics to zero for the associated service. |  |
| FlushLog |  |  |
| Description | Flushes the associated service's log to disk. |  |
| Syntax | ServiceObject.FlushLog |  |
| Return Type | none |  |
| Access | Viewer |  |
| Remarks | It is recommended that clients call FlushLog before retrieving and viewing the current log file for the associated service. |  |

IMCObjectMgr

The IMCObjectMgr interface derives from IMCService. This means that IMCObjectMgr inherits all IMCService properties and methods.

Properties

The IMCObjectMgr interface contains no properties other than those inherited from IMCService.

Methods

SimulateFileSystemRecovery

| Description | Simulates ENTERPRISE APPLICATION file system recovery on the associated server. |
|---|---|
| Syntax | ObjectMgr.SimulateFileSystemRecovery |
| Return Type | none |
| Access | Administrator |
| Remarks | Fails if a file system recovery simulation is already active on the associated server. |

APPENDIX E-continued

RecoverFileSystem

| | |
|---|---|
| Description | Attempts ENTERPRISE APPLICATION file system recovery on the associated server. |
| Syntax | ObjectMgr.RecoverFileSystem |
| Return Type | none |
| Access | Administrator |
| Remarks | Fails if file system recovery is already active on the associated server. |

SimulateIndexRecovery

| | |
|---|---|
| Description | Simulates ENTERPRISE APPLICATION index recovery on the associated server. |
| Syntax | ObjectMgr.SimulateIndexRecovery |
| Return Type | none |
| Access | Administrator |
| Remarks | Fails if an index recovery simulation is already active on the associated server. |

RecoverIndex

| | |
|---|---|
| Description | Attempts ENTERPRISE APPLICATION index recovery on the associated server. |
| Syntax | ObjectMgr.RecoverIndex |
| Return Type | none |
| Access | Administrator |
| Remarks | Fails if index recovery is already active on the associated server. |

IMCRendezvousMgr

The IMCRendezvousMgr interface derives from IMCService. This means that IMCRendezvousMgr inherits all IMCService properties and methods.

Properties

The IMCRendezvousMgr interface contains no properties other than those inherited from IMCService.

Methods

RendezvousNow

| | |
|---|---|
| Description | Synchronously starts a rendezvous cycle on the associated ENTERPRISE APPLICATION Rendezvous Manager service. |
| Syntax | RendezvousMgr.RendezvousNow |
| Return Type | none |
| Access | Administrator |
| Remarks | The RendezvousNow method has no effect on rendezvous threads that are currently mid-cycle. |

[1] the OmniKernel service is automatically indicated for all servers in the ENTERPRISE APPLICATION domain
[2] indicates the RouteEngine, Object Manager, and Transfer Manager services
[3] Originally IMCServer.Services was a property and the special error code 0xC0042001 was used to indicate that one or more expected services were not found on the server. IMCServer.Services was changed to a method and the error code was changed to S_FALSE as part of a workaround for MTS problem #Q236332. However, error code 0xC0042001 is still written to esmc.dbg as part of the message indicating this condition.

APPENDIX F

Here is a sample versionInfo XML string from the IMCDomain.MCVersionXML property:

```
<?xml version="1.0" ?22
<!-- MCDomain version info -->
<versionInfo>
  <vendor>Kodak</vendor>
  <product>Management Components</product>
  <component>MCDomain</component>
  <displayVersion>1.0</displayVersion>
  <buildNumber>15399</buildNumber>
  <copyright>Copyright (c) Kodak, 1988-1999</copyright>
</versionInfo>
```

Here is a sample versioninfo XML string from the IMCService.ServiceVersionXML property:

```
<?xml version="1.0" ?>
<!-- RouteEngine version info -->
<versionInfo>
  <vendor>Kodak</vendor>
  <product>Workflow</product>
  <component>RouteEngine</component>
  <displayVersion>4.0</displayVersion>
  <buildNumber>15399</buildNumber>
```

APPENDIX F-continued

<copyright>Copyright (c) Kodak, 1988-1999</copyright>
</versionInfo>

The following table specifies the element types comprising the XML strings returned by these properties:

| Element Type | Contains | Content Model or Data Type | Description |
|---|---|---|---|
| versionInfo | elements | (vendor, product, component, displayVersion, buildNumber, copyright) | Document root node. |
| vendor | text | string | Company name. |
| product | text | string | Product name. |
| component | text | string | Component name. |
| displayVersion | text | string | Displayable version string. |
| buildNumber | text | string | Build number. |
| copyright | text | string | Displayable copyright string. |

Common XML Attributes
The following read-only XML attributes are used with various service properties (described below):

| Attribute Name | Data Type | Description |
|---|---|---|
| max | int | Indicates the maximum allowable value for the associated element. Supports range checking in clients. |
| min | int | Indicates the minimum allowable value for the associated element. Supports range checking in clients. |
| name | string or enumeration | Indicates the unique name of the associated element. |

Common Properties
The following XML service properties pertain to all Management Components service classes except MCOmniKernel:

| Element Type | Contains | Content Model or Data Type | Attributes | Modifiable? | Description |
|---|---|---|---|---|---|
| displayName | text | string | | no | The displayable name associated with the parent element. |
| enable | text | boolean | | yes | Set to 1 if the feature associated with the parent element is enabled on the server, 0 otherwise. |
| filter | elements | (logMsgClass)+ | | | A collection of log message classes for the associated service. |
| log | elements | (filter, save) | | | Contains logging properties for the associated service instance. |
| logMsgClass | elements | (displayName, enable) | name | | Represents a class of ENTERPRISE APPLICATION log messages. The name attribute must be one of the following: ("debug" | "detail" |"event" |"log" | "sql" |"summary" |"timing" | "trace" | "warning"). |
| properties | elements | (log, *) | Contains generic ENTERPRISE | | APPLICATION log properties as well as service-specific properties described below. |
| save | text | boolean | | yes | Set to 1 if this class of log messages is saved on the server, 0 otherwise. |
| service | elements | (displayName, properties) | name Document root node. The name attribute indicates the service name in the SCM. | | |

MCIndexMgr Properties
Here is an example depicting all MCIndexMgr XML service properties:

```
<?xml version="1.0" ?>
<!-- Index Manager properties -->
<service name="IndexManager">
    <displayName>Index Manager</displayName>
    <properties>
        <log>
            <filter>
                <logMsgClass name="debug">
                    <displayName>Debug</displayName>
                    <enable>0</enable>
                </logMsgClass>
                <logMsgClass name="detail">
```

APPENDIX F-continued

```
            <displayName>Detail</displayName>
            <enable>1</enable>
        </logMsgClass>
        <logMsgClass name="event">
            <displayName>Event</displayName>
            <enable>1</enable>
        </logMsgClass>
        <logMsgClass name="sql">
            <displayName>Sql</displayName>
            <enable>0</enable>
        </logMsgClass>
        <logMsgClass name="summary">
            <displayName>Summary</displayName>
            <enable>1</enable>
        </logMsgClass>
        <logMsgClass name="timing">
            <displayName>Timing</displayName>
            <enable>0</enable>
        </logMsgClass>
        <logMsgClass name="trace">
            <displayName>Trace</displayName>
            <enable>0</enable>
        </logMsgClass>
        <logMsgClass name="warning">
            <displayName>Warning</displayName>
            <enable>0</enable>
        </logMsgClass>
      </filter>
      <save>1</save>
    </log>
    <indexOption>delete</indexOption>
    <createLocatorRecord>0 </createLocatorRecord>
    <updateLocatorRecord>0 </updateLocatorRecord>
    <exceptionClasses>
        <class name="CLASS1">
            <displayName>CLASS1</displayName>
        </class>
        <class name='CLASS2'>
            <displayName>CLASS2</displayName>
        </class>
    </exceptionClasses>
  </properties>
</service>
```

The following table specifies the XML service properties specific to MCIndexMgr:

| Element Type | Contains | Content Model or Data Type | Attributes | Modifiable? | Description |
| --- | --- | --- | --- | --- | --- |
| class | elements | displayName | name | | The name of a ENTERPRISE APPLICATION workitem class. The name attribute indicates the locale-independent class name. |
| createLocatorRecord | text | boolean | | yes | Used to create Eastman Software Relational Catalog entries for non-archived workitems (Enterprise Visibility). Requires service restart to apply changes. 0 Location Manager is not called, no catalog record is written, and the result of the domain index creation is returned to the caller. 1 When Index Manager receives a call to create a domain index for a workitem, it creates a domain index and calls Location Manager, which in turn calls the Catalog to create Catalog records for non-archived workitems. |
| exceptionClasses | elements | (class)+ | | | A collection of workitem classes that are exceptions to the indexOption setting. For example, if indexOption is set to DELETE, workitem classes listed in exceptionClasses will have their index entry updated. Conversely, if indexOption is set to UPDATE, |

APPENDIX F-continued

| | | | | |
|---|---|---|---|---|
| indexOption | text | ("delete"\| "update") | yes | workitem classes listed in exceptionClasses will have their index entry deleted. This entry can be left blank. Specifies the action to be performed on the index entry of a workitem after deletion from the domain. Requires service restart to apply changes.<br>delete<br>The Index entry is deleted from the Attributes table when the workitem is deleted from the domain. If the index entry of a workitem is deleted from Attributes, then the workitem can be retrieved from archive only by its name (and not by its index information).<br>update<br>The Index entry is updated in the Attributes table when the workitem is deleted from the domain. The entry will remain in the Attributes table with the OBJECT_SERVER column set to ARCHIVE. |
| properties | elements | (log, indexOption, createLocatorRecord, updateLocatorRecord, exceptionClasses) | | Contains all service properties. |
| updateLocatorRecord | text | boolean | yes | Used to update or create Catalog entries for non-archived workitems (Enterprise Visibility). Requires service restart to apply changes.<br>0 Location Manager is not called, no catalog record is written or updated, and the result of the domain index update is returned to the caller.<br>1 When Index Manager receives a call to update a workitem's name (rename) or class (reclassification), it updates the domain index and calls Location Manager, which in turn calls the Catalog to update or create a Catalog record. The update will update the workitem's name or class on the Catalog whether or not the workitem has been archived. If a Catalog record does not yet exist, and the name is now supplied, a new Catalog record is created. |

MCLocationMgr Properties
Here is an example depicting all MCLocationMgr XML service properties:

```xml
<?xml version="1.0" ?>
<!-- Location Manager properties -->
<service name="LocationManager">
    <displayName>Location Manager</displayName>
    <properties>
        <log>
            <filter>
                <logMsgClass name="debug">
                    <displayName>Debug</displayName>
                    <enable>0</enable>
                </logMsgClass>
                <logMsgClass name="detail">
                    <displayName>Detail</displayName>
                    <enable>1</enable>
                </logMsgClass>
                <logMsgClass name="event">
                    <displayName>Event</displayName>
                    <enable>1</enable>
                </logMsgClass>
                <logMsgClass name="sql">
```

APPENDIX F-continued

```
            <displayName>Sql</displayName>
            <enable>0</enable>
          </logMsgClass>
          <logMsgClass name="summary">
            <displayName>Summary</displayName>
            <enable>1</enable>
          </logMsgClass>
          <logMsgClass name="timing">
            <displayName>Timing</displayName>
            <enable>0</enable>
          </logMsgClass>
          <logMsgClass name="trace">
            <displayName>Trace</displayName>
            <enable>0</enable>
          </logMsgClass>
          <logMsgClass name="warning">
            <displayName>Warning</displayName>
            <enable>0</enable>
          </logMsgClass>
        </filter>
        <save>1</save>
      </log>
    </properties>
  </service>
```

The following table specifies the XML service properties specific to MCLocationMgr:

| Element Type | Contains | Content Model or Data Type | Attributes | Modifiable? | Description |
|---|---|---|---|---|---|
| properties | elements | (log) | | | Contains all service properties. |

None other than the common XML service properties are currently implemented.

MCObjectMgr Properties
Here is an example depicting all MCObjectMgr XML service properties:

```
<?xml version="1.0" ?>
<-- Object Manager properties -->
<service name="ObjectManager">
  <displayName>Object Manager</displayName>
  <properties>
    <log>
      <filter>
        <logMsgClass name="debug">
          <displayName>Debug</displayName>
          <enable>0</enable>
        </logMsgClass>
        <logMsgClass name="detail">
          <displayName>Detail</displayName>
          <enable>1</enable>
        </logMsgClass>
        <logMsgClass name="event">
          <displayName>Event</displayName>
          <enable>1</enable>
        </logMsgClass>
        <logMsgClass name="sql">
          <displayName>Sql</displayName>
          <enable>0</enable>
        </logMsgClass>
        <logMsgClass name="summary">
          <displayName>Summary</displayName>
          <enable>1</enable>
        </logMsgClass>
        <logMsgClass name="timing">
          <displayName>Timing</displayName>
          <enable>0</enable>
        </logMsgClass>
        <logMsgClass name="trace">
          <displayName>Trace</displayName>
          <enable>0</enable>
        </logMsgClass>
        <logMsgClass name="warning">
          <displayName>Warning</displayName>
          <enable>0</enable>
        </logMsgClass>
      </filter>
      <save>1</save>
    </log>
```

APPENDIX F-continued

```
         <acceptNewWork>1</acceptNewWork>
         <defaultWorkstep>Work Introduction</defaultWorkstep>
         <threads>
            <thread name="archive">
               <displayName>Archive</displayName>
               <enable>1</enable>
               <itemAge_days min="1">7</itemAge_days>
            </thread>
            <thread name="batch">
               <displayName>Batch</displayName>
               <enable>1</enable>
            </thread>
            <thread name="delete">
               <displayName>Delete</displayName>
               <enable>1</enable>
               <defaultCriterion>create</defaultCriterion>
               <defaultItemAge_days min="1" max="90">7</defaultItemAge_days>
               <defaultPollInterval_seconds
min="3600">86400</defaultPollInterval_seconds>
               <deletionGroups>
                  <deletionGroup ordinal="1">
                     <criterion>modify</criterion>
                     <itemAge_days min="1" max="90">7</itemAge_days>
                     <pollInterval_seconds
min="3600">21600</pollInterval_seconds>
                     <classes>
                        <class name="CLASS1">
                           <displayName>CLASS1</displayName>
                        </class>
                        <class name="CLASS2">
                           <displayName>CLASS2</displayName>
                        </class>
                     </classes>
                  </deletionGroup>
                  <deletionGroup ordinal="2">
                     <criterion>reference</criterion>
                     <itemAge_days>7</itemAge_days>
                     <pollInterval_seconds>43200</pollInterval_seconds>
                     <classes>
                        <class name="CLASS3">
                           <displayName>CLASS3</displayName>
                        </class>
                     </classes>
                  </deletionGroup>
               </deletionGroups>
            </thread>
         </threads>
      </properties>
   </service>
``` tc,1 The following table specifies the XML service properties specific to MCObjectMgr:

| Element Type | Contains | Content Model or Data Type | Attribute | Modifiable? | Description |
|---|---|---|---|---|---|
| acceptNewWork | text | boolean | | yes | Set to 1 if this server is accepting new work, 0 otherwise. |
| class | elements | displayName | name | | The name of a ENTERPRISE APPLICATION workitem class. The name attribute indicates the locale-independent class name. |
| classes | elements | (class)+ | | | A collection of classes comprising a deletion group. Applies only to deletionGroup elements. |
| criterion | text | ("create" | "modify" | "reference") | | yes | Indicates the comparison criterion for the associated deletion group. Applies only to deletionGroup elements.<br>create<br>Uses the date a workitem was created as the comparison criterion.<br>modify<br>Uses the date a workitem was last modified as the comparison criterion.<br>reference<br>Uses the date a workitem was last referenced (accessed) as the |

APPENDIX F-continued

| | | | | |
|---|---|---|---|---|
| defaultCriterion | text | ("create" \| "modify" \| "reference") | yes | comparison criterion. The default comparison criterion for the delete thread class. See the description for the criterion element type. Applies only to the delete thread class. |
| defaultItemAge_days | text | int | min, max yes | The default item age for the delete thread class. See the description for the itemAge_days element type. Applies only to the delete thread class. |
| defaultPollInterval_seconds | text | int | min yes | The default polling interval for the delete thread class. See the description for the pollInterval_seconds element type. Applies only to the delete thread class. |
| defaultWorkstep | text | string | yes | Specifies the name of the workstep onto which objects received from another domain are enqueued. It is also the workstep onto which items sent by users into workflow are initially enqueued. Requires service restart to apply changes. |
| deletionGroup | elements | (criterion, itemAge_days, pollInterval_seconds, classes) | ordinal | Describes an individual deletion group. The ordinal attribute uniquely identifies a particular deletion group. The ordinals for all deletion groups defined for a particular Object Manager service instance must comprise a set of consecutive integers starting at 1. |
| deletionGroups | elements | (deletionGroup)+ | | A collection of all deletion groups defined for this Object Manager service instance. Note that changing the properties for any individual deletion group requires specifying the properties for all deletion groups in the XML passed to IMCService.SetProperties, including groups that have not changed. Specifying only the changed groups is not supported. |
| itemAge_days | text | int | min, max yes | The age of workitems in days since the time of last modification before the associated action can occur. Applies to the archive thread class and to deletionGroup elements. |
| pollInterval_seconds | text | int | min yes | The deletion thread polling interval in seconds for the associated deletion group. Applies only to deletionGroup elements. |
| properties | elements | (log, acceptNewWork, defaultWorkstep, threads) | | Contains all service properties. |
| thread | elements | (displayName, enable, *) | name | Contains configuration details about a particular thread class. The name attribute identifies the thread class and must be one of the following: ("archive" \| "batch" \| "delete"). |
| threads | elements | (thread)+ | | A collection of thread classes for this service. |

MCRendezvousMgr Properties
Here is an example depicting all MCRendezvousMgr XML service properties:

```
<?xml version="1.0" ?>
<!-- Rendezvous Manager properties -->
<service name="RendezvousManager">
    <displayName>Rendezvous Manager</displayName>
    <properties>
        <log>
            <filter>
                <logMsgClass name="debug">
                    <displayName>Debug</displayName>
                    <enable>0</enable>
```

APPENDIX F-continued

```
            </logMsgClass>
            <logMsgClass name="detail">
                <displayName>Detail</displayName>
                <enable>1</enable>
            </logMsgClass>
            <logMsgClass name="event">
                <displayName>Event</displayName>
                <enable>1</enable>
            </logMsgClass>
            <logMsgClass name="sql">
                <displayName>Sql</displayName>
                <enable>0</enable>
            </logMsgClass>
            <logMsgClass name="summary">
                <displayName>Summary</displayName>
                <enable>1</enable>
            </logMsgClass>
            <logMsgClass name="timing">
                <displayName>Timing</displayName>
                <enable>0</enable>
            </logMsgClass>
            <logMsgClass name="trace38 >
                <displayName>Trace</displayName>
                <enable>0</enable>
            </logMsgClass>
            <logMsgClass name="warning">
                <displayName>Warning</displayName>
                <enable>0</enable>
            </logMsgClass>
          </filter>
          <save>1</save>
        </log>
        <worksteps>
          <workstep name="RNDSTEP1">
            <displayName>RNDSTEP1</displayName>
          </workstep>
          <workstep name="RNDSTEP2">
            <displayName>RNDSTEP2</displayName>
          </workstep>
          <workstep name="RNDSTEP3">
            <displayName>RNDSTEP3</displayname>
          </workstep>
        </worksteps>
      </properties>
    </service>
```

The following table specifies the XML service properties specific to MCRendezvousMgr:

| Element Type | Contains | Content Model or Data Type | Attributes | Modifiable? | Description |
| --- | --- | --- | --- | --- | --- |
| properties | elements | (log, worksteps) | | | Contains all service properties. |
| workstep | elements | (displayName) | name | | A workstep assigned to the associated Rendezvous Manager service instance. The name attribute indicates the name of the workstep. |
| worksteps | elements | (workstep)+ | | | A collection of worksteps assigned to the associated Rendezvous Manager service instance. |

MCRouteEngine Properties
Here is an example depicting all MCRouteEngine XML service properties:

```
<?xml version=1.0" ?>
<!-- RouteEngine properties -->
<service name="RouteEngine">
    <displayName>RouteEngine</displayName>
    <properties>
      <log>
        <filter>
          <logMsgClass name="debug">
            <displayName>Debug</displayName>
            <enable>0</enable>
          </logMsgClass>
          <logMsgClass name="detail">
            <displayName>Detail</displayName>
            <enable>1</enable>
          </logMsgClass>
```

APPENDIX F-continued

```
            <logMsgClass name="event">
                <displayName>Event</displayName>
                <enable>1</enable>
            </logMsgClass>
            <logMsgClass name="sql">
                <displayName>Sql</displayName>
                <enable>0</enable>
            </logMsgClass>
            <logMsgClass name="summary">
                <displayName>Summary</displayName>
                <enable>1</enable>
            </logMsgClass>
            <logMsgClass name="timing">
                <displayName>Timing</displayName>
                <enable>0</enable>
            </logMsgClass>
            <logMsgClass name="trace">
                <displayName>Trace</displayName>
                <enable>0</enable>
            </logMsgClass>
            <logMsgClass name="warning">
                <displayName>Warning</displayName>
                <enable>0</enable>
            </logMsgClass>
        </filter>
        <save>1</save>
    </log>
    <control>1</control>
    <route>demo.rte</route>
</properties>
</service>
```

The following table specifies the XML service properties specific to MCRouteEngine:

| Element Type | Contains | Content Model or Data Type | Attributes | Modifiable? | Description |
| --- | --- | --- | --- | --- | --- |
| control | text | boolean | | no | Set to 1 if this RouteEngine service instance is the domain controller, 0 otherwise. |
| properties | elements | (log, control, route) | | | Contains all service properties. |
| route | text | string | | yes | The name of the route file loaded by this RouteEngine service instance. Requires service restart to apply changes. |

MCSecurityMgr Properties
Here is an example depicting all MCSecurityMgr XML service properties:

```
<?xml version="1.0" ?>
<!-- Security Manager properties -->
<service name="SecurityManager">
    <displayName>Security Manager</displayName>
    <properties>
        <log>
            <filter>
                <logMsgClass name="debug">
                    <displayName>Debug</displayName>
                    <enable>0</enable>
                </logMsgClass>
                <logMsgClass name="detail">
                    <displayName>Detail</displayName>
                    <enable>1</enable>
                </logMsgClass>
                <logMsgClass name="event">
                    <displayName>Event</displayName>
                    <enable>1</enable>
                </logMsgClass>
                <logMsgClass name="sql">
                    <displayName>Sql</displayName>
                    <enable>0</enable>
                </logMsgClass>
                <logMsgClass name="summary">
                    <displayName>Summary</displayName>
                    <enable>1</enable>
                </logMsgClass>
                <logMsgClass name="timing">
                    <displayName>Timing</displayName>
```

APPENDIX F-continued

```
              <enable>0</enable>
            </logMsgClass>
            <logMsgClass name="trace">
              <displayName>Trace</displayName>
              <enable>0</enable>
            </logMsgClass>
            <logMsgClass name="warning">
              <displayName>Warning</displayName>
              <enable>0</enable>
            </logMsgClass>
          </filter>
          <save>1</save>
        </log>
      </properties>
    </service>
```

The following table specifies the XML service properties specific to MCSecurityMgr:

| Element Type | Contains | Content Model or Data Type | Attributes | Modifiable? | Description |
|---|---|---|---|---|---|
| properties | elements | (log) | | | Contains all service properties. |

None other than the common XML service properties are currently implemented.

MCTransferMgr Properties
Here is an example depicting all MCTransferMgr XML service properties:

```
<?xml version="1.0" ?>
<!-- Transfer Manager properties -->
<service name="TransferManager">
  <displayName>Transfer Manager</displayName>
  <properties>
    <log>
      <filter>
        <logMsgClass name="debug">
          <displayName>Debug</displayName>
          <enable>0</enable>
        </logMsgClass>
        <logMsgClass name="detail">
          <displayName>Detail</displayName>
          <enable>1</enable>
        </logMsgClass>
        <logMsgClass name="event">
          <displayName>Event</displayName>
          <enable>1</enable>
        </logMsgClass>
        <logMsgClass name="sql">
          <displayName>Sql</displayName>
          <enable>0</enable>
        </logMsgClass>
        <logMsgClass name="summary">
          <displayName>Summary</displayName>
          <enable>1</enable>
        </logMsgClass>
        <logMsgClass name="timing">
          <displayName>Timing</displayName>
          <enable>0</enable>
        </logMsgClass>
        <logMsgClass name="trace">
          <displayName>Trace</displayName>
          <enable>0</enable>
        </logMsgClass>
        <logMsgClass name="warning">
          <displayName>Warning</displayName>
          <enable>0</enable>
        </logMsgClass>
      </filter>
      <save>1</save>
    </log>
    <defaultPollInterval_seconds min="15" max="86400">300</defaultPollInterval_seconds>
    <threads>
      <thread name="archive">
        <displayName>Archive</displayName>
        <enable>1</enable>
        <number min="1" max="10">2</number>
        <pollInterval_seconds min="15">300</pollInterval_seconds>
        <server>ARCHIVE01</server>
```

APPENDIX F-continued

```
            </thread>
            <thread name="delete">
               <displayName>Delete</displayName>
               <enable>1</enable>
               <number min="1" max="10">1</number>
               <pollInterval_seconds min="15">300</pollInterval_seconds>
            </thread>
            <thread name="pipe">
               <displayName>Pipe</displayName>
               <enable>1</enable>
               <preAlloc min="1" max="256">64</preAlloc>
               <requestFile>remote.fil</requestFile>
               <requestFileBackup>back.fil</requestFileBackup>
            </thread>
            <thread name="program">
               <displayName>Program</displayName>
               <enable>1</enable>
               <number min="1" max="10">3</number>
               <pollInterval_seconds min="15">300</pollInterval_seconds>
            </thread>
            <thread name="request">
               <displayName>Request</displayName>
               <enable>1</enable>
               <faxWorkstep>FAX</faxWorkstep>
               <printWorkstep>PRINT</printWorkstep>
            </thread>
            <thread name="request2">
               <displayName>Request2</displayName>
               <pollInterval_seconds min="15"
      max="86400">300</pollInterval_seconds>
            </thread>
            <thread name="transfer">
               <displayName>Transfer</displayName>
               <enable>1</enable>
               <number min="1" max="10" >1</number>
            </thread>
         </threads>
      </properties>
   </service>
``` tc,1 The following table specifies the XML service properties specific to MCTransferMgr:

| Element Type | Contains | Content Model or Data Type | Attributes | Modifiable? | Description |
| --- | --- | --- | --- | --- | --- |
| defaultPollInterval_seconds | text | int | min, max | yes | The polling interval in seconds for the request and transfer thread classes. |
| faxWorkstep | text | string | | yes | The name of the fax workstep to be used by the request thread. Applies only to the request thread class. Requires service restart to apply changes. |
| number | text | int | min, max | yes | The number of threads to run for the associated thread class. Applies to the archive, delete, program, and transfer thread classes. Requires service restart to apply changes. |
| pollInterval_seconds | text | int | min, max | yes | The polling interval in seconds for the associated thread class. Applies to the archive, delete, program, and request2 thread classes. |
| preAlloc | text | int | min, max | yes | The number of files the Domain Controller preallocates to the REQUEST queue of this server. Applies only to the pipe thread class. Requires service restart to apply changes. |
| printWorkstep | text | string | | yes | The name of the print workstep to be used by the request thread. Applies only to the request thread class. Requires service restart to apply changes. |
| properties | elements | (log, defaultPollInterval_seconds, threads) | | | Contains all service properties. |
| requestFile | text | string | | yes | The fully qualified name of the |

APPENDIX F-continued

| | | | | | |
|---|---|---|---|---|---|
| | | | | | remote request file to which the Remote Request Manager program writes. Applies only to the pipe thread class. Requires service restart to apply changes. |
| requestFileBackup | text | string | | yes | The fully qualified name of the Remote Request Backup file. Applies only to the pipe thread class. Requires service restart to apply changes. |
| server | text | string | | yes | The name of the archive server to be used by all archive threads in this service instance. Applies only to the archive thread class. Requires service restart to apply changes. |
| thread | elements | (displayName, enable, *) | name | | Contains configuration details about a particular thread class. The name attribute identifies the thread class and must be one of the following: ("archive" \| " delete" \| "pipe" \|"program" \| "request" \| "request2" \| "transfer"). |
| threads | elements | (thread)+ | | | A collection of thread classes for this service. |

Common Statistics
The following XML service statistics pertain to all Management Components service classes that implement statistics:

| Element Type | Contains | Content Model or Data Type | Attributes | Description |
|---|---|---|---|---|
| baseTime | text | dateTime | | The base time (from the server clock) for the associated statistics. Useful for calculating moving averages and other metrics. |
| currentTime | text | dateTime | | The timestamp (from the server clock) of the associated statistics snapshot. |
| displayName | text | string | | The displayable name associated with the parent element. |
| service | elements | (displayName, statistics) | name | Document root node. The name attribute indicates the service name in the SCM. |
| statistics | elements | (currentTime, baseTime, *) | | Contains both generic and service specific statistics. |

MCIndexMgr Statistics
Here is an example depicting all MCIndexMgr XML service statistics:

```xml
<?xml version="1.0" ?>
<!-- Index Manager statistics -->
<service name="IndexManager">
    <displayName>Index Manager</displayName>
    <statistics>
      <currentTime>1999-04-01T13:01:09</currentTime>
      <baseTime>1999-03-29T09:08:15</baseTime>
      <txTypes>
        <txType name="create">
          <displayName>Create</displayName>
          <count >198</count>
          <errors>2</errors>
          <maxTxTime__msec>7900</maxTxTime__msec>
          <minTxTime__msec>300</minTxTime__msec>
          <totalTxTime__msec>403913360</totalTxTime__msec>
        </txType>
        <txType name="createEntVisible">
<displayName>Create - Enterprise Visible</displayName>
          <count>198</count>
          <errors>2</errors>
          <maxTxTime__msec>7900</maxTxTime__msec>
          <minTxTime__msec>300</minTxTime__msec>
          <totalTxTime__msec>403913360</totalTxTime__msec>
        </txType>
        <txType name="createAttrib">
          <displayName>Create Attributes</displayName>
          <count>198</count>
          <errors>2</errors>
          <maxTxTime__msec>7900</maxTxTime__msec>
          <minTxTime__msec>300</minTxTime__msec>
```

APPENDIX F-continued

```
        <totalTxTime_msec>403913360</totalTxTime_msec>
      </txType>
      <txType name=_"createAttribEntVisible">
        <displayName>Create Attributes - Enterprise
Visible</displayName>
        <count>198</count>
        <errors>2</errors>
        <maxTxTime_msec>7900</maxTxTime_msec>
        <minTxTime_msec>300</minTxTime_msec>
        <totalTxTime_msec>403913360</totalTxTime_msec>
      </txType>
      <txType name="createLoc">
        <displayName>Create Locator Record</displayName>
        <count>198</count>
        <errors>2</errors>
        <maxTxTime_msec>7900</maxTxTime_msec>
        <minTxTime_msec>300</minTxTime_msec>
        <totalTxTime_msec>403913360</totalTxTime_msec>
      </txType>
      <txType name="delete">
        <displayName>Delete</displayName>
        <count>198</count>
        <errors>2</errors>
        <maxTxTime_msec>7900</maxTxTime_msec>
        <minTxTime_msec>300</minTxTime_msec>
        <totalTxTime_msec>403913360</totalTxTime_msec>
      </txType>
      <txType name="deleteEntVisible">
        <displayName>Delete - Enterprise Visible</displayName>
        <count>198</count>
        <errors>2</errors>
        <maxTxTime_msec>7900</maxTxTime_msec>
        <minTxTime_msec>300</minTxTime_msec>
        <totalTxTime_msec>403913360</totalTxTime_msec>
      </txType>
      <txType name="entLock">
        <displayName>Enterprise Lock</displayName>
        <count>198</count>
        <errors>2</errors>
        <maxTxTime_msec>7900</maxTxTime_msec>
        <minTxTime_msec>300</minTxTime_msec>
        <totalTxTime_msec>403913360</totalTxTime_msec>
      </txType>
      <txType name="getAddress">
        <displayName>Get Address</displayName>
        <count>198</count>
        <errors>2</errors>
        <maxTxTime_msec>7900</maxTxTime_msec>
        <minTxTime_msec>300</minTxTime_msec>
        <totalTxTime_msec>403913360</totalTxTime_msec>
      </txType>
      <txType name="getLocVersion">
        <displayName>Get Locator Version</displayName>
        <count>198</count>
        <errors>2</errors>
        <maxTxTime_msec>7900</maxTxTime_msec>
        <minTxTime_msec>300</minTxTime_msec>
        <totalTxTime_msec>403913360</totalTxTime_msec>
      </txType>
      <txType name="query">
        <displayName>Query</displayName>
        <count>198</count>
        <errors>2</errors>
        <maxTxTime_msec>7900</maxTxTime_msec>
        <minTxTime_msec>300</minTxTime_msec>
        <totalTxTime_msec>403913360</totalTxTime_msec>
      </txType>
      <txType name="queryAttribList">
        <displayName>Query Attribute List</displayName>
        <count>198</count>
        <errors>2</errors>
        <maxTxTime_msec>7900</maxTxTime_msec>
        <minTxTime_msec>300</minTxTime_msec>
        <totalTxTime_msec>403913360</totalTxTime_msec>
      </txType>
      <txType name="queryEnt">
        <displayName>Query Enterprise</displayName>
        <count>198</count>
        <errors>2</errors>
```

APPENDIX F-continued

```xml
    <maxTxTime_msec>7900</maxTxTime_msec>
    <minTxTime_msec>300</minTxTime_msec>
    <totalTxTime_msec>403913360</totalTxTime_msec>
</txType>
<txType name="queryGeneric">
    <displayName>Query Generic</displayName>
    <count>198</count>
    <errors>2</errors>
    <maxTxTime_msec>7900</maxTxTime_msec>
    <minTxTime_msec>300</minTxTime_msec>
    <totalTxTime_msec>403913360</totalTxTime_msec>
</txType>
<txType name="queryName">
    <displayName>Query Name</displayName>
    <count>198</count>
    <errors>2</errors>
    <maxTxTime_msec>7900</maxTxTime_msec>
    <minTxTime_msec>300</minTxTime_msec>
    <totalTxTime_msec>403913360</totalTxTime_msec>
</txType>
<txType name="queryuniqueName">
    <displayName>Query Unique Name</displayName>
    <count>198</count>
    <errors>2</errors
    <maxTxTime_msec>7900</maxTxTime_msec>
    <minTxTime_msec>300</minTxTime_msec>
    <totalTxTime_msec>403913360</totalTxTime_msec>
</txType>
<txType name="renameClass">
    <displayName>Rename Class</displayName>
    <count>198</count>
    <errors>2</errors>
    <maxTxTime_msec>7900</maxTxTime_msec>
    <minTxTime_msec>300</minTxTime_msec>
    <totalTxTime_msec>403913360</totalTxTime_msec>
</txType>
<txType name="restore">
    <displayName>Restore</displayName>
    <count>198</count>
    <errors>2</errors>
    <maxTxTime_msec>7900</maxTxTime_msec>
    <minTxTime_msec>300</minTxTime_msec>
    <totalTxTime_msec>403913360</totalTxTime_msec>
</txType>
<txType name="restoreEntVisible">
    <displayName>Restore - Enterprise Visible</displayName>
    <count>198</count>
    <errors>2</errors>
    <maxTxTime_msec>7900</maxTxTime_msec>
    <minTxTime_msec>300</minTxTime_msec>
    <totalTxTime_msec>403913360</totalTxTime_msec>
</txType>
<txType name="sysDelete">
    <displayName>System Delete</displayName>
    <count>198</count>
    <errors>2</errors>
    <maxTxTime_msec>7900</maxTxTime_msec>
    <minTxTime_msec>300</minTxTime_msec>
    <totalTxTime_msec>403913360</totalTxTime_msec>
</txType>
<txType name="sysDeleteEntVisible">
    <displayName>System Delete - Enterprise Visible</displayName>
    <count>198</count>
    <errors>2</errors>
    <maxTxTime_msec>7900</maxTxTime_msec>
    <minTxTime_msec>300</minTxTime_msec>
    <totalTxTime_msec>403913360</totalTxTime_msec>
</txType>
<txType name="update">
    <displayName>Update</displayName>
    <count>198</count>
    <errors>2</errors>
    <maxTxTime_msec>7900</maxTxTime_msec>
    <minTxTime_msec>300</minTxTime_msec>
    <totalTxTime_msec>403913360</totalTxTime_msec>
</txType>
<txType name="updateAddress">
    <displayName>Update Address</displayName>
    <count>198</count>
```

APPENDIX F-continued

```
            <errors>2</errors>
            <maxTxTime_msec>7900</maxTxTime_msec>
            <minTxTime_msec>300</minTxTime_msec>
            <totalTxTime_msec>403913360</totalTxTime_msec>
         </txType>
         <txType name="updateClass">
            <displayName>Update Class</displayName>
            <count>198</count>
            <errors>2</errors>
            <maxTxTime_msec>7900</maxTxTime_msec>
            <minTxTime_msec>300</minTxTime_msec>
            <totalTxTime_msec>403913360</totalTxTime_msec>
         </txType>
         <txType name="updateClassEntVisible">
            <displayName>Update Class - Enterprise Visible</displayName>
            <count>198</count>
            <errors>2</errors>
            <maxTxTime_msec>7900</maxTxTime_msec>
            <minTxTime_msec>300</minTxTime_msec>
            <totalTxTime_msec>403913360</totalTxTime_msec>
         </txType>
         <txType name="updateName">
            <displayName>Update Name</displayName>
            <count>198</count>
            <errors>2</errors>
            <maxTxTime_msec>7900</maxTxTime_msec>
            <minTxTime_msec>300</minTxTime_msec>
            <totalTxTime_msec>403913360</totalTxTime_msec>
         </txType>
<        txType name="updateNameEntVisible">
            <displayName>Update Name - Enterprise Visible</displayName>
            <count>198</count>
            <errors>2</errors>
            <maxTxTime_msec>7900</maxTxTime_msec>
            <minTxTime_msec>300</minTxTime_msec>
            <totalTxTime_msec>403913360</totalTxTime_msec>
         </txType>
      </txTypes>
   </statistics>
</service>
```

The following table specifies the XML service statistics specific to MCIndexMgr:

| Element Type | Contains | Content Model or Data Type | Attributes | Description |
| --- | --- | --- | --- | --- |
| count | text | int | | The number of transactions processed since the base time. |
| errors | text | int | | The number of transactions that failed since the base time. |
| maxTxTime_msec | text | int | | The maximum duration of a transaction in milliseconds since the base time. |
| minTxTime_msec | text | int | | The minimum duration of a transaction in milliseconds since the base time. |
| statistics | elements | (currentTime, baseTime, txTypes) | | Contains all service statistics. |
| totalTxTime_msec | text | int | | The sum of all transaction durations in milliseconds since the base time. Note that this value may exceed the capacity of a 32-bit integer. Use a 64-bit integer to store this value in code. |
| txType | elements | (displayName, count, errors, maxTxTime_msec, minTxTime_msec, totalTxTime_msec) | name | Contains statistics for a particular type of transaction associated with this service. The name element must be one of the following: ("create" | "createEntVisible" |0 "createAttrib" | "createAttribEntVisible" | "createLoc" | "delete" | "deleteEntVisible" | "entLock" | "getAddress" | "getLocVersion" | "query" | "queryAttribList" | "queryEnt"0 | "queryGeneric" | "queryName" | "queryUniqueName" | "renameClass" | "restore" | "restoreEntVisible" | "sysDelete" | "sysDeleteEntVisible" | "update" | "updateAddress" | "updateClass" | "updateClassEntVisible" | |

APPENDIX F-continued

| txTypes | elements | (txType)+ | "updateName" \| "updateNameEntVisible"). A collection of transaction types associated with this service.. |
|---|---|---|---|

MCRendezvousMgr Statistics
Here is an example depicting all MCRendezvousMgr XML service statistics:

```xml
<?xml version="1.0" ?>
<!-- Rendezvous Manager statistics -->
<service name="RendezvousManager">
    <displayName>Rendezvous Manager</displayName>
    <statistics>
        <currentTime>1999-04-01T13:01:09</currentTime>
        <baseTime>1999-03-29T09:08:15</baseTime>
        <worksteps>
            <workstep name="RNDSTEP1">
                <displayName>RNDSTEP1</displayName>
                <candidatesExpired>3</candidatesExpired>
                <candidatesRemaining>94</candidatesRemaining>
                <candidatesRemoved>248</candidatesRemoved>
                <candidatesRouted>324</candidatesRouted>
                <containersCreated>52</containersCreated>
                <containersExpired>S</containersExpired>
                <containersRemaining>105</containersRemaining>
                <containersRouted>153</containersRouted>
                <cyclesCompleted>35</cyclesCompleted>
                <errorItems>11</errorItems>
                <rendezvousCompleted>572</rendezvousCompleted>
            </workstep>
            <workstep name="RNDSTEP2">
                <displayName>RNDSTEP2</displayName>
                <candidatesExpired>3</candidatesExpired>
                <candidatesRemaining>94</candidatesRemaining>
                <candidatesRemoved>248</candidatesRemoved>
                <candidatesRouted>224</candidatesRouted>
                <containersCreated>52</containersCreated>
                <containersExpired>5</containersExpired>
                <containersRemaining>105</containersRemaining>
                <containersRouted>153</containersRouted>
                <cyclesCompleted>35</cyclesCompleted>
                <errorItems>11</errorItems>
                <rendezvousCompleted>572</rendezvousCompleted>
            </workstep>
            <workstep name="RNDSTEP3">
                <displayName>RNDSTEP3</displayName>
                <candidatesExpired>3</candidatesExpired>
                <candidatesRemaining>94</candidatesRemaining>
                <candidatesRemoved>248</candidatesRemoved>
                <candidatesRouted>324</candidatesRouted>
                <containersCreated>52</containersCreated>
                <containersExpired>5</containersExpired>
                <containersRemaining>105</containersRemaining>
                <containersRouted>153</containersRouted>
                <cyclesCompleted>35</cyclesCompleted>
                <errorItems>11</errorItems>
                <rendezvousCompleted>572</rendezvousCompleted>
            </workstep>
        </worksteps>
    </statistics>
</service>
```

The following table specifies the XML service statistics specific to MCRendezvousMgr:

| Element Type | Contains | Content Model or Data Type | Attributes | Description |
|---|---|---|---|---|
| candidatesExpired | text | int | | The number of candidates expired at this workstep since the base time. |
| candidatesRemaining | text | int | The number of candidates currently | remaining at this workstep. |
| candidatesRemoved | text | int | | The number of candidates removed at this workstep since the base time. |
| candidatesRouted | text | int | | The number of candidates routed at this workstep since the base time. |
| containersCreated | text | int | | The number of containers created at this workstep since the base time. |

APPENDIX F-continued

| | | | | |
|---|---|---|---|---|
| containersExpired | text | int | | The number of containers expired at this workstep since the base time. |
| containersRemaining | text | int | | The number of containers remaining at this workstep since the base time. |
| containersRouted | text | int | | The number of containers routed at this workstep since the base time. |
| cyclesCompleted | text | int | | The number of cycles completed by this workstep since the base time. |
| errorItems | text | int | | The number of workitems placed in error at this workstep since the base time. |
| rendezvousCompleted | text | int | | The number of rendezvous completed at this workstep since the base time. |
| statistics | elements | (currentTime, baseTime, worksteps) | | Contains all service statistics. |
| workstep | elements | (candiatesExpired, candidatesRemaining, candidatesRemoved, candidatesRouted, candidatesCreated, containersExpired, containersRemaining, containersRouted, cyclesCompleted, errorItems, rendezvousCompleted) | name | Contains statistics for a workstep assigned to the associated Rendezvous Manager service instance. The name attribute indicates the name of the workstep. |
| worksteps | elements | (workstep)+ | | A collection of worksteps assigned to the associated Rendezvous Manager service instance. |

MCTransferMgr Statistics
Here is an example depicting all MCTransferMgr XML service statistics:

```xml
<?xml version="1.0" ?>
<!-- Transfer Manager statistics -->
<service name="TransferManager">
   <displayName>Transfer Manager</displayName>
   <statistics>
     <currentTime>1999-04-01T13:01:09</currentTime>
     <baseTime>1999-03-29T09:08:15</baseTime>
     <threads>
        <thread name="archive">
           <displayName>Archive</displayName>
           <errors>5</errors>
           <processed>99</processed>
         <status>active</status>
        </thread>
        <thread name="delete">
           <displayName>Delete</displayName>
           <errors>0</errors>
           <processed>24</processed>
           <status>idle</status>
        </thread>
        <thread name="pipe">
           <displayName>Pipe</displayName>
           <errors>0</errors>
           <processed>0</processed>
           <status>disabled</status>
        </thread>
        <thread name="program">
           <displayName>Program</displayName>
           <errors>1</errors>
           <processed>302</processed>
           <status>active</status>
        </thread>
        <thread name="request">
           <displayName>Request</displayName>
           <errors>0</errors>
           <processed>0</processed>
           <status>disabled</status>
        </thread>
        <thread name="transfer">
           <displayName>Transfer</displayName>
           <errors>0</errors>
           <processed>210</processed>
           <status>active</status>
```

APPENDIX F-continued

```
        </thread>
      </threads>
    </statistics>
  </service>
```

The following table specifies the XML service statistics specific to MCTransferMgr:

| Element Type | Contains | Content Model or Data Type | Attributes | Description |
|---|---|---|---|---|
| errors | text | int | | The number of errors encountered by this thread class since the base time. |
| processed | text | int | | The number of workitems processed by this thread class since the base time. |
| statistics | elements | (currentTime, baseTime, threads) | | Contains all service statistics. |
| status | text | ("active" \| "disabled" \| "idle") | | The current thread class status. |
| thread | elements | (displayName, errors, processed, status) | name | Contains statistics for a particular thread class. The name attribute identifies the thread class and must be one of the following: ("archive" \| "delete" \| "pipe" \| "program" \| "request" \| "transfer"). |
| threads | elements | (thread)+ | | A collection of thread classes for this service. |

XML Error Lists

Because IMCService.SetProperties supports the bulk modification of many properties at once using XML, it is possible that multiple errors may occur on a single call. In the event that one or more properties cannot be set, IMCService.SetProperties generates HRESULT 0xC9042000. The Description property of the associated COM error object contains an XML string listing the detailed errors that occurred and for which properties.

Here is an example depicting an XML error list generated by a call to IMCService.SetProperties:

```
<?xml version="1.0"?>
<errorList>
  <error code="0xC004200A">
    <property name="/service [@name= 'ObjectManager'] /properties/log/save"/>
    <property name="/service [@name= 'ObjectManager'] /properties/acceptNewWork"/>
    <property name="service [@name='ObjectManager'] /properties/threads/thread[@name='archive'] /itemAge_days [@min='1'] "/>
  </error>
  <error code="0xC0042005"/>
</errorList>
```

The following table specifies the XML error list elements:

| Element Type | Contains | Content Model or Data Type | Attributes | Description |
|---|---|---|---|---|
| errorList | elements | (error)+ | | Document root node. A collection of errors. |
| error | elements | (property)* | code | An error. The code attribute indicates the hexadecimal error code prefixed with "0x". May contain zero or more associated property elements. |
| property | empty | string | name | Contains an XSL pattern string identifying a property associated with the parent error element. See the Microsoft XML Developer's Guide at http://msdn.microsoft.com/xml for information on XSL patterns. |

APPENDIX G

Registry Keys and Values

The Management Components use the following new registry keys and values, where <MC Root Key> refers to the following registry path: HKEY_LOCAL_MACHINE\SOFTWARE\Kodak\Management Components

| | |
|---|---|
| Key | <MC Root Key>\CurrentVersion |
| Value Name | CurrentVersion |
| Value Type | REG_SZ |
| Value | <Management Components version number> |
| Default | none |
| Machines | All Management Components hosts. |
| Description | The current version of the Management Components installed on the machine. The Management Components install program sets this. |
| Example | CurrentVersion:REG_SZ:1.0 |
| Key | <MC Root Key>\<Version>\ProgrammaticSecurity |
| Value Name | Disable |
| Value Type | REG_SZ |
| Values | 0 or 1 |
| Default | 0 |
| Machines | All Management Components hosts. |
| Description | Setting this registry value to 1 disables programmatic MTS role checking in the Management Components. The Management Components install program creates this registry value with an initial value of 0 (programmatic security enabled). |
| Example | DisableProgrammaticSecurity:REG_SZ:1 |
| Key | <MC Root Key>\<Version> |
| Value Name | Domains |
| Value Type | REG_MULTI_SZ |
| Values | <domain name 1><domain name 2> ... <domain name N> |
| Default | none |
| Machines | All MCDomain hosts. |
| Description | The list of domains that local MCDomain instances are allowed to manage. If the value does not exist or if the value is empty, local MCDomain instances are allowed to manage any domain. |
| Example | Domains:REG_MULTI_SZ:Domain1 Domain2 Domain3 |
| Key | <MC Root Key>\<Version> |
| Value Name | ESWM Root Key |
| Value Type | REG_SZ |
| Value | <registry key> |
| Default | none |
| Machines | All Management Components hosts. |
| Description | The root registry key used by the current version of the ENTERPRISE APPLICATION services. The ENTERPRISE APPLICATION install program sets this. |
| Example | ESWM Root Key:REG_SZ: SOFTWARE\Kodak\Eastman Software Work Management\4.0\ESWM |
| Key | <MC Root Key>\<Version> |
| Value Name | LOG_DIR |
| Value Type | REG_SZ |
| Values | <pathname> |
| Default | none |
| Machines | Optional. Typically used only on machines hosting Management Components without any local ENTERPRISE APPLICATION services. |
| Description | If and only if the registry value <ESWM Root Key>\COMMON\LOG_DIR is not present, then this secondary registry value will determine the location for the Management Components dbg file, esmc.dbg. The Management Components install program sets this. This optional registry value is not typically used because the Management Components are typically colocated with one or more ENTERPRISE APPLICATION Services and therefore reference the <ESWM Root Key>\COMMON\LOG_DIR value instead. |
| Example | LOG_DIR:REG_SZ:d:\enterprise applicationlogs |
| Key | <MC Root Key>\<Version>\Service Classes |
| Value Name | <service name> |
| Value Type | REG_SZ |
| Value | <class ID> |
| Default | none |
| Machines | Any machine hosting one or more ENTERPRISE APPLICATION services, e.g. any MCServer host. |
| Description | The class ID of the component that implements the IMCService interface for the service class specified by <service name>, as registered in the local SCM, in curly braces. The Management Components install program sets this. |
| Example | RouteEngine:REG_SZ: {849A349C-B20A-11D2-90EC-00A024E8ADDE} |
| Key | <ESWM Root Key>\COMMON |
| Value Name | CHILD SERVERS |
| Value Type | REG_MULTI_SZ |
| Values | <server name 1> <server name 2> ... <server name N> |
| Default | none |
| Machines | ENTERPRISE APPLICATION Domain controllers. |
| Description | The list of child servers in the domain excluding the domain controller. For a single-node domain, this key will be either empty or not present. The ENTERPRISE APPLICATION install program sets this. |
| Example | CHILD SERVERS:REG_MULTI_SZ:ChildSrv1 ChildSrv2 ChildSrv3 |
| Key | <ESWM Root Key>\COMMON |
| Value Name | LOG_DIR |
| Value Type | REG_SZ |
| Values | <pathname> |
| Default | none |
| Machines | Any machine hosting one or more ENTERPRISE APPLICATION services, e.g. any MCServer host. |
| Description | The location for ENTERPRISE APPLICATION log and dbg files and also for the Management Components dbg file, esmc.dbg. The ENTERPRISE APPLICATION install program sets this. |
| Example | LOG_DIR:REG_SZ:d:\enterprise applicationlogs |
| Key | <ESWM Root Key>\COMMON |
| Value Name | RENDEZVOUS SERVERS |
| Value Type | REG_MULTI_SZ |
| Values | <server name 1> <server name 2> ... <server name N> |
| Default | none |
| Machines | ENTERPRISE APPLICATION Domain controllers. |
| Description | The list of rendezvous servers in the domain. If there are no rendezvous servers in the domain, this key will be either empty or not present. The ENTERPRISE APPLICATION install program sets this. |
| Example | RENDEZVOUS SERVERS:REG_MULTI_SZ:RndzSrv1 RndzSrv2 RndzSrv3 |
| Keys | <ESWM Root Key>\INDEX |
| | <ESWM Root Key>\KERNEL |
| | <ESWM Root Key>\LOCATOR |
| | <ESWM Root Key>\OBJECT |
| | <ESWM Root Key>\RNDZMGR |
| | <ESWM Root Key>\ROUTE |
| | <ESWM Root Key>\SECURITY |
| | <ESWM Root Key>\TRANSFER |
| Value Name | InstallDate |
| Value Type | REG_SZ |
| Value | <year>-<month>-<day>-<hour>.<minutes>.<seconds>.<milliseconds> |
| Default | none |
| Machines | ENTERPRISE APPLICATION Servers |
| Description | The ENTERPRISE APPLICATION install program writes this timestamp to the registry upon successful completion of ENTERPRISE APPLICATION Service installation. |
| Example | InstallDate:REG_SZ:1999-02-12-15.56.56.75 |
| Keys | <ESWM Root Key>\INDEX |
| | <ESWM Root Key>\KERNEL |
| | <ESWM Root Key>\LOCATOR |
| | <ESWM Root Key>\OBJECT |
| | <ESWM Root Key>\RNDZMGR |
| | <ESWM Root Key>\ROUTE |
| | <ESWM Root Key>\SECURITY |
| | <ESWM Root Key>\TRANSFER |
| Value Name | LastStartTime |
| Value Type | REG_SZ |
| Value | <year>-<month>-<day>-<hour>.<minutes>.<seconds>.<milliseconds> |
| Default | none |
| Machines | ENTERPRISE APPLICATION Servers |
| Description | This timestamp is written to the registry upon successful completion of ENTERPRISE APPLICATION Service initialization. |

APPENDIX G-continued

Registry Keys and Values

| | |
|---|---|
| Example | LastStartTime:REG_SZ:1999-02-12-15.56.56.75 |
| Key | <ESWM Root Key>\NETCALL |
| Value Name | */* |
| Value Type | REG_SZ |
| Value | TCP/IP |
| Machines | All Management Components hosts. |
| Description | The Management Components require TCP/IP to be configured in the NETCALL key for all APIs. The ENTERPRISE APPLICATION install program sets this. |
| Example | */*:REG_SZ:TCP/IP |
| Key | <ESWM Root Key>\NETMODULE |
| Value Name | TCP/IP |
| Value Type | REG_SZ |
| Value | PASTCPIP |
| Default | none |
| Machines | All Management Components hosts. |
| Description | The Management Components require the TCP/IP protocol to be configured in the NETMODULE key. The ENTERPRISE APPLICATION install program sets this. |
| Example | TCP/IP:REG_SZ:PASTCPIP |
| Key | <ESWM Root Key>\NETSETUP |
| Value Name | MC<protocol instance #> |
| Value Type | REG_SZ |
| Value | TCP/IP |
| Default | none |
| Machines | All Management Components hosts. |
| Description | This registry value is necessary to allow the Management Components to make network calls into the ENTERPRISE APPLICATION Services. Since the Management Components only support TCP/IP, this registry value must be set to "TCP/IP". The protocol instance number is generally 1 unless other protocols are also configured. The Management Components install program sets this. |
| Example | MC1:REG_SZ:TCP/IP |

What is claimed is:

1. A computerized method of monitoring and administering remote computer resources in a computer network, the method comprising:

installing a remote software agent configured to access an inactive background process of a remote computer resource, the inactive background process capable of operating without interaction with a user while the user is working on another task;

composing an Extensible Markup Language (XML) document configured to provide structured data to the remote software agent, the composed XML document including instructions to inactive background processes;

automatically generating the XML document containing desired data regarding network attributes;

returning the automatically generated XML document; and preventing the remote software agent from autonomously migrating across the computer network.

2. The method of claim 1, wherein the remote software agent implements Component Object Model (COM) component interfaces.

3. The method of claim 1, wherein the remote software agent utilizes objects implementing a Common Object Request Broker Architecture (CORBA) interface.

4. A computerized method of monitoring and administering remote computer resources on a network, the method comprising:

in a subject network, installing a remote software agent configured to access an inactive background process of a remote computer resource, the inactive background process capable of operating without interaction with a user while the user is working on another task;

composing an Extensible Markup Language (XML) document configured to provide structured data to the remote software agent, the composed XML document including instructions to inactive background processes;

automatically generating the XML document containing desired data regarding network attributes;

returning the automatically generated XML document; and preventing the remote software agent from autonomously migrating across the network.

5. The method of claim 4, wherein the composed instructions to the inactive background processes comprise at least encapsulated reusable interface code.

\* \* \* \* \*

UNITED STATES PATENT AND TRADEMARK OFFICE
CERTIFICATE OF CORRECTION

PATENT NO. : 7,610,588 B1  Page 1 of 1
APPLICATION NO. : 09/697958
DATED : October 27, 2009
INVENTOR(S) : Hager et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Twelfth Day of October, 2010

David J. Kappos
*Director of the United States Patent and Trademark Office*